(12) United States Patent
Zhu et al.

(10) Patent No.: US 11,780,362 B2
(45) Date of Patent: Oct. 10, 2023

(54) VEHICLE HAVING A VISIBLE AND NON-VISIBLE LIGHTING PROJECTION DEVICE WITH A LIGHT SOURCE MOUNTED ON A ROTARY ACTUATOR

(71) Applicant: HASCO VISION TECHNOLOGY CO., LTD., Shanghai (CN)

(72) Inventors: He Zhu, Shanghai (CN); Dapan Zhang, Shanghai (CN); Zhiping Qiu, Shanghai (CN); Wenhui Sang, Shanghai (CN)

(73) Assignee: Hasco Vision Technology Co., Ltd., Shanghai (CN)

( * ) Notice: Subject to any disclaimer, the term of this patent is extended or adjusted under 35 U.S.C. 154(b) by 0 days.

(21) Appl. No.: 17/640,222

(22) PCT Filed: Nov. 25, 2020

(86) PCT No.: PCT/CN2020/131345
§ 371 (c)(1),
(2) Date: Mar. 3, 2022

(87) PCT Pub. No.: WO2021/104286
PCT Pub. Date: Jun. 3, 2021

(65) Prior Publication Data
US 2022/0314867 A1 Oct. 6, 2022

(30) Foreign Application Priority Data
Nov. 27, 2019 (CN) .......................... 201922119431.0
Jan. 9, 2020 (CN) .......................... 202020045138.4

(51) Int. Cl.
*F21S 41/657* (2018.01)
*B60Q 1/06* (2006.01)
(Continued)

(52) U.S. Cl.
CPC .............. *B60Q 1/06* (2013.01); *F21S 41/143* (2018.01); *F21S 41/151* (2018.01); *F21S 41/255* (2018.01); *F21S 41/657* (2018.01)

(58) Field of Classification Search
CPC ...... F21S 41/657; F21S 41/151; F21S 41/153; F21S 41/141
See application file for complete search history.

(56) References Cited

U.S. PATENT DOCUMENTS

| | | | |
|---|---|---|---|
| 6,828,544 B2 | 12/2004 | Stephan et al. | |
| 10,119,669 B2 | 11/2018 | Arai | |

(Continued)

FOREIGN PATENT DOCUMENTS

| | | |
|---|---|---|
| CN | 211316066 U | 8/2020 |
| CN | 211442116 U | 9/2020 |

(Continued)

*Primary Examiner* — Robert J May
(74) *Attorney, Agent, or Firm* — Volpe Koenig

(57) ABSTRACT

Disclosed are a vehicle lighting device, and an invisible light projection device comprising the vehicle lighting device. The vehicle lighting device comprises a light source, a rotary actuator, a light distribution element and a controller. The light source is mounted on a rotating shaft of the rotary actuator and the controller is adapted to control a light-emitting state of the light source creating different light forms. The vehicle lighting device creates a range of light distribution with less light sources, and has good heat dissipation capability. The invisible light projection device comprises a light source of an invisible light-emitting element, the rotary actuator, and the controller, which is adapted to control the light-emitting state of the invisible light-emitting element at different rotation positions creating light distribution of invisible light. The invisible light projection device can carry out invisible light irradiation on a dark area of vehicle lighting, improving vehicle safety.

19 Claims, 19 Drawing Sheets

(51) Int. Cl.
*F21S 41/143* (2018.01)
*F21S 41/255* (2018.01)
*F21S 41/151* (2018.01)

(56) References Cited

U.S. PATENT DOCUMENTS

| | | |
|---|---|---|
| 10,239,442 B2 | 3/2019 | Arai |
| 2002/0005826 A1 | 1/2002 | Pederson |
| 2006/0239018 A1 | 10/2006 | Jardin |
| 2015/0022085 A1 | 1/2015 | Dross |
| 2019/0035317 A1 | 1/2019 | Rohena et al. |
| 2019/0342482 A1 | 11/2019 | Totsch et al. |

FOREIGN PATENT DOCUMENTS

| | | | |
|---|---|---|---|
| DE | 20115799 U1 | | 4/2002 |
| EP | 2010413 B1 | | 10/2012 |
| EP | 2631534 A2 | | 8/2013 |
| EP | 2827048 A1 | | 1/2015 |
| JP | 2010282935 A | * | 12/2010 |
| JP | 2015509653 A | | 3/2015 |
| JP | 2015101204 A | | 6/2015 |
| JP | 2018063891 A | | 4/2018 |
| KR | 1020150073682 A | | 7/2015 |
| WO | 2010093278 A1 | | 8/2010 |
| WO | 2016093154 A1 | | 6/2016 |
| WO | 2016129396 A1 | | 8/2016 |
| WO | WO-2020039890 A1 | * | 2/2020 |

\* cited by examiner

VEHICLE HAVING A VISIBLE AND NON-VISIBLE LIGHTING PROJECTION DEVICE WITH A LIGHT SOURCE MOUNTED ON A ROTARY ACTUATOR

CROSS REFERENCE TO RELATED APPLICATIONS

This application is a 35 USC § 371 National Stage application of International Patent Application No. PCT/CN2020/131345, which was filed Nov. 25, 2020, entitled "VEHICLE LIGHTING DEVICE, VEHICLE INVISIBLE LIGHT PROJECTION DEVICE, AND TARGET OBJECT DETECTION DEVICE" and claims priority to Chinese Patent Application No. 201922119431.0, filed Nov. 27, 2019 and Chinese Patent Application No. 202020045138.4, filed Jan. 9, 2020, which are incorporated herein by reference as if fully set forth.

FIELD OF THE INVENTION

The present disclosure relates to a vehicle lighting system, in particular to a vehicle lighting device. The present disclosure also relates to a vehicle invisible light projection device, and a target object detection device.

BACKGROUND OF THE INVENTION

In recent years, the matrix headlight and adaptive driving beam (ADB) lighting technology has developed progressively, in which a lighting range of light can be automatically adjusted according to positions of other road users on the road, thus improving driving safety, but also laying the foundation for intelligent driving. In addition, pixelated signal lamps have developed to some extent. The multi-pixelation of the signal lamps causes the signal lamps to have more diversified functions and forms, and have more sense of technology and future.

A matrix headlight means that the light shape of a vehicle lamp is divided into multiple light shape areas, and the illumination of light of each light shape area can be controlled independently to form a light distribution with one or more dark areas. ADB can detect an environment in which a vehicle is located and conditions of other road users according to a detection probe, and control the vehicle lamp to form different light distributions according to the detected information. Thus, the light shape can be changed according to the environment in which the vehicle is located, to avoid dazzling other road users, while improving the visual experience of a driver of this vehicle and improving the driving safety. For example, when there are no other road users ahead, the matrix headlight illuminates all light shape areas, and when there is an opposite vehicle ahead, the matrix headlight dynamically turns off a light shape area corresponding to the opposite vehicle, to achieve a light shape with a local area being dark and other areas being bright, to prevent the light from stimulating the eyes of a driver of the opposite vehicle, thus improving the driving safety.

Most of the existing matrix headlights or pixelated signal lamps use matrix light-emitting units, in which multiple rows and multiple columns of light-emitting units correspond to corresponding lighting areas or corresponding pixels. The existing light-emitting units are still relatively large in area, and there is a large gap between the adjacent light-emitting units, so multiple primary optical elements need to be provided corresponding to the light-emitting units to direct light emitted by each light-emitting unit to a relatively compact area to achieve functions of the matrix headlight or pixelated signal lamp. This technical solution mainly has the following shortcomings: (1) a large number of light-emitting units and primary optical elements are arranged to result in a high cost, a large volume and a high weight; (2) the arrangement of the large number of light-emitting units causes much heat generated by a lighting device, and a concentrated light-emitting area causes difficulty in heat dissipation, while the large number of primary optical elements adopting polymer materials are more easily affected by heat; and (3) with the arrangement of the large number of light-emitting units, a heat sink is also very large, and a cooling fan also needs to be arranged, so that the lighting device occupies a larger space.

There is also a technology in which a few light-emitting units are used to emit light, and a rotatable reflector is used to reflect light emitted by each light-emitting unit to a certain area, and the light-emitting units are controlled to turned on/off to cooperatively achieve illumination of multiple lighting areas or a regional display function. Compared with the traditional matrix headlight or pixelated signal lamp, this technology uses a smaller number of light-emitting units, but still has the following shortcomings: (1) the arrangement of the light-emitting units, the rotatable reflector and corresponding brackets leads to larger overall space occupied by the lighting device; (2) the rotatable reflector is structurally complicated, and especially, a reflective surface corresponding to a reflective area of light has great difficulty in design and machining. There is a drawback that the lighting device is not simple enough in structure, which is not conducive to wide-range promotion and popularization in the market.

In addition, a dark area formed by the existing matrix headlight and ADB forms an area that cannot be observed by a driver of a vehicle, so that the driver is unable to judge the activities of road users in the dark area or identify obstacles in the dark area, thus bringing new influences for driving safety. An irradiation range of the vehicle lamp is limited when the vehicle travels at night. Especially when a high beam is used for illumination, the irradiation range of the high beam is relatively small. A road user outside the high beam illumination range cannot be observed by the driver, which may also become a hidden risk for driving safety, especially when the road user is moving laterally. These are safety shortcomings of the existing matrix headlight and ADB, and affect their market application and promotion.

SUMMARY OF THE INVENTION

A technical problem to be solved by the present disclosure is to provide a vehicle lighting device, with fewer light-emitting units and a simple structure, capable of achieving functions of a matrix headlight or a pixelated signal lamp.

A further technical problem to be solved by the present disclosure is to provide an invisible light projection device, with fewer invisible light-emitting units, capable of forming an invisible light distribution with a controlled light shape.

Another technical problem to be solved by the present disclosure is to provide a target object detection device capable of detecting target objects within an irradiation range formed by the invisible light projection device of the present disclosure.

To solve the above technical problems, in an aspect of the present disclosure, a vehicle lighting device is provided, and comprises a light source, a rotary actuator, a light distribution element, and a controller, wherein the light source is mounted on a rotating shaft of the rotary actuator; and the controller is adapted to control a light-emitting state of the light source so as to create different light shapes.

Preferably, the vehicle lighting device of the present disclosure further comprises a light distribution element, wherein the light distribution element is arranged at an area in proximity to the light source, the light source includes a plurality of independently controllable light-emitting units, and the light distribution element is adapted to converge light emitted by the light-emitting units; and the controller is adapted to control the light-emitting units to be turned on/off respectively according to a rotational speed of the rotary actuator.

Further preferably, the vehicle lighting device of the present disclosure further comprise a mounting plate, wherein the mounting plate is mounted on the rotating shaft of the rotary actuator, and the light source is mounted on the mounting plate. With this preferred technical solution, the mounting plate can better ensure stable rotation of the light source, achieve more arrangement manners of the light source, and also improve the mounting strength of the light source and ensure the stability of the vehicle lighting device.

Preferably, the light-emitting units are located on different rotation radii of the rotary actuator. In this preferred technical solution, the light-emitting units located on different rotation radii of the rotary actuator can form different light-emitting pixels on a rotation plane, to improve the irradiation accuracy or display resolution of the vehicle lighting device.

Preferably, the light-emitting units are divided into at least two groups, the light-emitting units in each group of light-emitting units are located on different rotation radii of the rotary actuator. In this preferred technical solution, each group of light-emitting units cooperate with each other to further improve the lighting accuracy and/or lighting brightness of the vehicle lighting device.

Preferably, the light-emitting units are divided into at least two groups, each group of light-emitting units are arranged symmetrically on a rotation circumference of the rotary actuator. With this preferred technical solution, the rotational speed of the rotary actuator may be set to be lower and the stability of rotation is higher, and meanwhile, a program for the controller is relatively simple.

Preferably, the vehicle lighting device further includes a lens, wherein light emitted by the light-emitting units is projected by the lens to form a specific light shape. In this preferred technical solution, the lens can converge light emitted by the light-emitting units, so that the light shape formed by the vehicle lighting device of the present disclosure is projected farther and has higher clarity.

Preferably, the light distribution element is reflectors arranged in areas on two sides of the light-emitting units. In this preferred technical solution, the reflectors can reflect large-angle scattered light emitted by the light-emitting units to a direction in front of the light-emitting units, to improve the convergence of light emitted by the light-emitting units.

Preferably, reflective surfaces of the reflectors are planar surfaces or curved surfaces; and each reflector is arranged on a side of the plurality of light-emitting units. With this preferred technical solution, the planar or curved reflective surfaces can achieve different convergence effects on light emitted by the light-emitting units, and different curved reflective surfaces can also be specially designed for the distribution of reflected light, to obtain a more reasonable reflected light distribution. The arrangement of one reflector on the side of the plurality of light-emitting units can reduce the number of the reflectors and improve the stability of the lighting device.

Preferably, the light distribution element is a condenser arranged in a light emergent surface area of the light-emitting units, the condenser includes a light incident surface and a light emergent surface, the light incident surface of the condenser is adapted to introduce light emitted by the light-emitting units, and light converged by the condenser is adapted to be emitted from the light emergent surface of the condenser. With this preferred technical solution, light emitted from the light-emitting units enters the condenser through the light incident surface, and converged light is emitted from the light emergent surface of the condenser. Different light convergence degrees and different light distributions can be designed by designing different condensers, so that the control of the light shape is more refined, a light shape with higher accuracy can be formed.

Preferably, the condenser is arranged in the light emergent surface area of the plurality of the light-emitting units. In this preferred technical solution, by arranging the same condenser on light emergent surfaces of the plurality of the light-emitting units, the convergence of light emitted by all the light-emitting units can be achieved with fewer condensers, to simplify the structure of the vehicle lighting device and improve its stability.

Preferably, the condenser is a strip-like transparent device with a cross section in the shape of an isosceles trapezoid, wherein a surface on which an upper base of the isosceles trapezoid is located is the light incident surface of the condenser, and a surface on which a lower base of the isosceles trapezoid is located is the light emergent surface of the condenser. In this preferred technical solution, light emitted from the light-emitting units enters the condenser from the surface on which the upper base of the isosceles trapezoid is located, and the large-angle scattered light is reflected by a surface on which legs of the isosceles trapezoid are located to be emitted from the surface on which the lower base of the isosceles trapezoid is located, to achieve convergence of light emitted by the light-emitting units.

Preferably, the condenser is a transparent cuboid device with a cylindrical surface, the cylindrical surface of the transparent device is the light emergent surface of the condenser, and a surface opposite to the cylindrical surface is the light incident surface of the condenser. In the preferred technical solution, the condenser is equivalent to a plano-convex cylindrical lens, an axial meridian of which is in the same direction as the arrangement direction of the light-emitting units, to achieve convergence of light emitted by the light-emitting units in the direction of a refractive power meridian of the plano-convex cylindrical lens.

Preferably, the condenser is a plurality of integrally formed plano-convex lenses, planar surfaces of the plurality of plano-convex lenses face a same direction to form the light incident surface of the condenser, and convex surfaces of the plurality of plano-convex lenses form the light emergent surface of the condenser. With this preferred technical solution, a plano-convex lens is formed on the light emergent surface of each light-emitting unit to achieve convergence of light emitted by each light-emitting unit. The plano-convex lenses can converge light emitted by the light-emitting units in all directions, with a better convergence effect and higher accuracy of the formed light shape.

Preferably, the condenser is a plurality of integrally formed light concentrators, light incident surfaces of the plurality of light concentrators are in one-to-one correspondence with the plurality of light-emitting units, and light emergent surfaces of the plurality of light concentrators form a same smooth surface. In this preferred technical solution, the plurality of light concentrators commonly used in a headlight are formed integrally and arranged on the light emergent surfaces of the plurality of light-emitting units to converge light emitted by the light-emitting units; the technology is relatively mature, and the light convergence effect is good.

In a second aspect of the present disclosure, a vehicle invisible light projection device is provided, including the vehicle lighting device provided in the first aspect of the present disclosure, wherein the light source comprises invisible light-emitting elements; and the controller is electrically connected to the invisible light-emitting elements and the rotary actuator, and the controller is adapted to controlling light-emitting states of the invisible light-emitting elements at different rotation positions to create light distribution of invisible light.

Preferably, the invisible light projection device of the present disclosure further includes a mounting plate, wherein the mounting plate is mounted on the rotating shaft of the rotary actuator, and the light source is mounted on the mounting plate. With this preferred technical solution, the mounting plate can improve the mounting strength of the light source and ensure the stability of the light source during rotation.

Preferably, there are a plurality of invisible light-emitting elements which are located on different rotation radii of the rotary actuator. In this preferred technical solution, invisible light emitted by the plurality of invisible light-emitting units located on different rotation radii can form a larger irradiation range and increase the illuminance and resolution of the irradiation.

Further preferably, the light source further includes light-emitting units, and the controller is further electrically connected to the light-emitting units to control light-emitting states of the light-emitting units at different rotation positions to create light distribution of visible light. In this preferred technical solution, the invisible light-emitting elements are capable of forming an invisible light distribution, and at the same time, the light-emitting units are capable of forming a visible light distribution.

Further, an irradiation range of invisible light emitted by the invisible light-emitting elements is at least capable of covering an irradiation range of visible light emitted by the light-emitting units. In this preferred technical solution, no matter which part of the irradiation range of visible light emitted by the light-emitting units forms a visible light irradiation dark area, it can be irradiated by invisible light emitted by the invisible light-emitting elements, to prevent safety risks caused by the visible light irradiation dark area.

Further, invisible light emitted by the invisible light-emitting elements is capable of forming separate invisible light irradiation areas outside the irradiation range of visible light. With this preferred technical solution, the separate invisible light irradiation area outside the irradiation range of visible light can expand the irradiation range outside the irradiation range of visible light to facilitate monitoring of safety conditions in a larger area outside the vehicle.

Preferably, the invisible light projection device of the present disclosure further includes a lens, wherein the lens is capable of projecting invisible light and visible light emitted by the invisible light-emitting elements and the light-emitting units. In this preferred technical solution, the lens can refract invisible light and visible light, which are projected to form a clearer light distribution pattern, and can increase projection distances of invisible light distribution and visible light distribution.

Preferably, the invisible light-emitting elements and/or the light-emitting units are provided with a light distribution element, wherein the light distribution element is adapted to converge light emitted by the invisible light-emitting elements and the light-emitting units. In this preferred technical solution, the light distribution element can converge invisible light emitted by the invisible light-emitting elements and visible light emitted by the light-emitting units, so that more light is converged in the same direction, to improve the illuminance and clarity of light.

In a third aspect of the present disclosure, a target object detection device is provided, which includes an invisible light detection device capable of detecting target objects within an irradiation range of invisible light formed by the invisible light projection device provided in the second aspect of the present disclosure.

Preferably, the target object detection device of the present disclosure further includes a visible light detection device capable of detecting target objects within the irradiation range of visible light formed by the light-emitting units. In this preferred technical solution, the visible light detection device can detect target objects within the irradiation range of visible light in a timely and accurate manner to prevent negligence and misjudgment of a driver of the vehicle.

With the above technical solution, the vehicle lighting device of the present disclosure uses the plurality of light-emitting units, which are much less than those in a matrix headlight or a pixelated signal lamp, to achieve the functions of the matrix headlight or the pixelated signal lamp; the device is simple in structure, low in cost, small in volume, convenient to control and good in heat dissipation effect. The use of the light distribution element improves the convergence degree of light emitted by each light-emitting unit and increases the clarity and the resolution of the light shape. In the invisible light projection device of the present disclosure, the invisible light-emitting elements are arranged on the rotary actuator; and light-emitting states of the invisible light-emitting elements at different rotation positions are controlled by the controller, to create light distribution of invisible light of a controllable light shape. The invisible light-emitting elements keeps rotating while emitting light, which improves the heat dissipation effect of the invisible light-emitting elements, so that a heat dissipation device of the invisible light-emitting elements may be simplified or even omitted. The target object detection device of the present disclosure is capable of detecting invisible light within the entire irradiation range formed by the invisible light projection device of the present disclosure, and discovering safety conditions that cannot be discovered by the driver of the vehicle, and thus the driving safety is improved.

Other features and advantages of the present disclosure will be described in detail in the subsequent specific embodiments.

BRIEF DESCRIPTION OF THE SYMBOLS

| 1 | Light source | 11 | Light-emitting unit |
|---|---|---|---|
| 12 | Invisible light-emitting element | 2 | Rotary actuator |
|  |  | 31 | Reflector |
| 3 | Light distribution element | 4 | Mounting plate |
|  |  | 6 | Bracket |
| 32 | Condenser | N1, N2, N3 | Separate invisible light irradiation area |
| 5 | Lens |  |  |
| M | Visible light irradiation area |  |  |

DETAILED DESCRIPTION OF THE EMBODIMENTS

In the present disclosure, the orientations or positional relationships indicated by orientation words such as "up", "down", "left", "right", "front", and "back" are based on the orientations or positional relationships of the present disclosure in a state of use, unless stated to the contrary, wherein a normal driving direction of a vehicle is "front".

In the present disclosure, the term "light distribution element" refers to an light optical element that can change a propagation direction of all or part of light to change an original light distribution. Its way of changing the light propagation direction may be reflection, refraction, or may also be any other possible way. The term "condenser" refers to an optical device that allows light to converge in at least one direction when light passes through.

In the description of the present disclosure, it should be noted that the terms "mount", "connection" and the like should be understood in a broad sense unless otherwise clearly specified and defined. For example, the term "connection" may be a fixed connection, may also be a detachable connection, or an integrated connection; it may be a direct connection, or may also be an indirect connection through an intermediate medium, and it may be an internal connection of two elements or an interaction relationship between two elements. For those of ordinary skill in the art, the specific meanings of the above terms in the present disclosure may be understood according to specific circumstances.

Specific embodiments of the present disclosure are described below in detail in conjunction with the accompanying drawings. It should be understood that the specific embodiments described here are only used for illustrating and explaining the present disclosure, and the protection scope of the present disclosure is not limited to the following specific embodiments.

Figure 1:
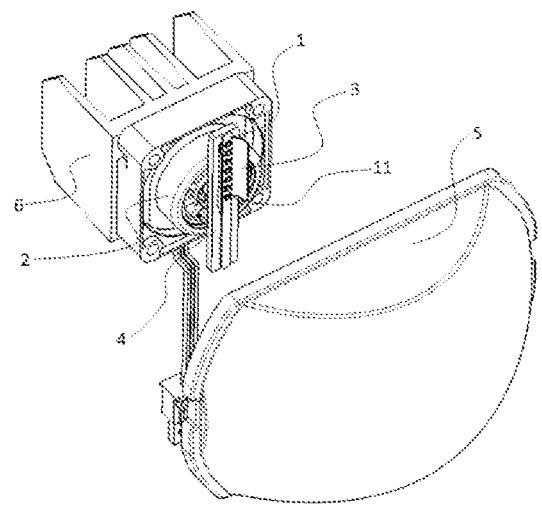
FIG. 1 is a three-dimensional structure diagram of an embodiment of a vehicle lighting device of the present disclosure.
Figure 2:
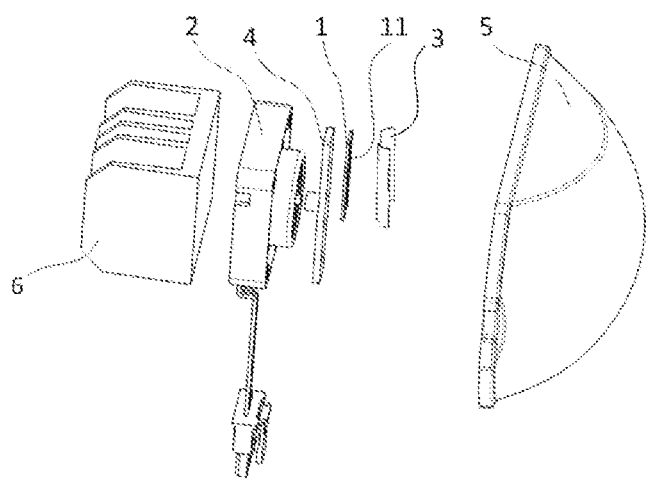
FIG. 2 is an exploded diagram of components of an embodiment of a vehicle lighting device of the present disclosure.
Figure 3:
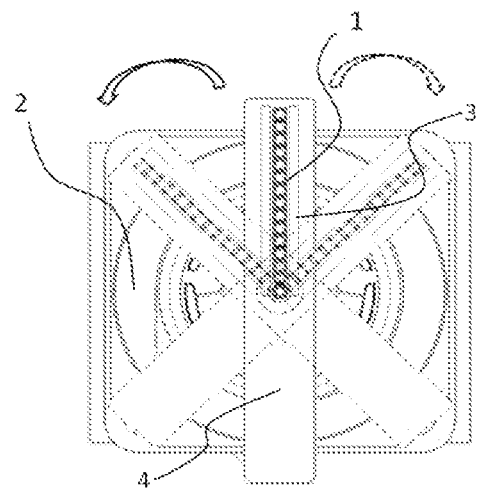
FIG. 3 is a schematic diagram of a rotating state of an embodiment of a vehicle lighting device of the present disclosure.

As shown in FIGS. 1 and 2, in an embodiment of the present disclosure, a vehicle lighting device includes a light source 1, a rotary actuator 2, a light distribution element 3 and a controller. The light source 1 is provided with a plurality of light-emitting units 11 which is capable of independently emitting light and is arranged in sequence. The light-emitting units 11 select light-emitting elements that can quickly emit light and be quickly turned off, and preferably select light-emitting elements with sufficient luminous intensity and small volumes. LEDs, laser diodes, or the like may be used in the present disclosure. The light distribution element 3 is arranged in proximity to the light source 1, and used to converge light emitted by the light-emitting units 11, which on the one hand, can improve the illuminating brightness of light emitted by the light-emitting units 11, and on the one hand, can avoid mutual influence between light emitted by different light-emitting units 11, to improve the accuracy of a formed light shape. The light distribution element 3 may be a reflector 31 arranged on a side of the light source 1, or may be a condenser 32 arranged in front of the light source 1, or may also be any other possible device capable of converging light. The light source 1 is mounted on a rotating shaft of the rotary actuator 2 and can be driven by the rotary actuator 2 to rotate at a high speed. The plurality of light-emitting units 11 are arranged from a rotation center of the light source 1 to the periphery. In this embodiment, the specific arrangement of the light-emitting units 11 is not limited, but a straight-line distance from the outermost light-emitting unit 11 to the rotation center determines a light-emitting range. Gaps between the light-emitting units 11 may be equal or unequal, and may be adjusted by those skilled in the art according to the optical properties. To maintain the balance of the light source 1 in a high-speed rotating state, a corresponding empty area needs to be retained on an opposite side of an area where the light-emitting units 11 of the light source 1 are arranged. The light distribution element 3 may be mounted on the rotary actuator 2 or may also be mounted on the light source 1 to be able to rotate synchronously with the light source 1. The balance in the rotating state of the rotary actuator 2 also needs to be considered when the light distribution element 3 is arranged. The rotary actuator 2 selects a rotary drive device capable of rotating at a high speed and feeding back the rotating state, such as a DC motor with a rotational speed feedback electrode, and may also select a rotary drive device with precise rotational speed control, such as a servo motor. A controller (not shown in the figures) can receive a rotational speed signal of the rotary actuator 2, and control the light-emitting units 11 to be turned on or off at each moment, respectively, according to the rotational speed of the rotary actuator 2, so that the light-emitting units have a same on/off state within certain time when rotating to a same position, and a fixed light shape is formed due to the persistence of vision principle. The formed light shape may be changed by changing the on/off state of the light-emitting units 11 at a specific moment; and an animated light shape may also be formed by controlling the on/off state of the light emitting units 11 in a unit time period to change slowly according to a certain rule. A stable light shape may be formed when the rotational speed of the rotary actuator 2 reaches 25 revolutions per second, i.e., 1500 revolutions per minute. The higher the rotational speed of the rotary actuator 2, the higher the stability of the light shape. In this embodiment, a rotational speed of 3000 revolutions per minute is recommended. As shown in FIG. 3, the rotary actuator 2 may rotate in a clockwise direction or in a counterclockwise direction, and its rotational direction is only related to a control program of the controller and does not affect the implementation of the function of the present disclosure. The increase in the number of the light-emitting units 11 per unit length may improve the irradiation accuracy or display resolution of the vehicle lighting device of the present disclosure. Using light-emitting units 11 that can emit high-brightness white light, the vehicle lighting device of the present disclosure may be used to replace a matrix headlight. Using lower-brightness color light-emitting units 11, the vehicle lighting device of the present disclosure may be used to replace a pixelated signal lamp. A 51-series single chip microcomputer that is widely used currently is used as the controller, and an MCS-51 single chip microcomputer is used in this embodiment, its control and programming methods are known to those skilled in the related art, and are not improved in the present disclosure, and thus are not described herein.

As shown in FIGS. 1 and 2, the vehicle lighting device of the present disclosure may also be provided with a bracket 6. The rotary actuator 2 is mounted on the bracket 6 and fixed on a lamp body by means of the bracket 6. Connection between relevant components is implemented by conventional connection methods such as welding, riveting, screw connection or gluing, to the extent that functions described in this specification are achieved. The light source 1 is powered by an existing device that may supply power in a rotating state, and preferably, a conductive slip ring is used to supply power to the light source 1. The power supply structure is not shown in the figures. The controller may be integrated on a circuit board of the light source 1, or in the rotary actuator 2, or connected at the outside of the device in the form of a separate circuit board.

In some embodiments of the vehicle lighting device of the present disclosure, as shown in FIGS. 1 and 2, the vehicle lighting device of the present disclosure also includes a mounting plate 4, wherein the center of the mounting plate 4 is fixed on the rotating shaft of the rotary actuator 2; the light source 1 and the light distribution element 3 are mounted on the mounting plate 4; the light-emitting units 11 on the light source 1 are arranged from the center to an edge of one side of the mounting plate 4; and the light distribution element 3 is arranged on two sides of the arrangement direction of the light-emitting units 11. When in rotation, the rotary actuator 2 drives the mounting plate 4 to rotate, thereby driving the light source 1 and the light distribution element 3 to rotate together around the rotating shaft of the rotary actuator 2. The mounting plate 4 may be made of an insulating material with certain mechanical strength, preferably insulating plastic with high thermal conductivity, so that on the one hand, the mounting plate 4 may be better fixed on the rotating shaft of the rotary actuator 2, and on the other hand, can better support the light source 1 to prevent vibration or deformation of the light source 1 during high-speed rotation and ensure the stability of the formed light shape.

In some embodiments of the vehicle lighting device of the present disclosure, the light-emitting units 11 of the light source 1 are located on different rotation radii of the rotary actuator 2. At the moment, the rotational trajectory of each light-emitting unit 11 forms a circle with a different radius when the rotary actuator 2 rotates for one circle, and each light-emitting unit 11 constitutes a different pixel in a rotation plane at each moment during rotation. Thus, the resolution of the formed light shape is higher. The light-emitting units 11 may be arranged on a line segment with one end passing through the rotating shaft of the rotary actuator 2, or may also be arranged on a plurality of line segments with one ends passing through the rotating shaft of the rotary actuator 2, or may even be scattered on a circle with the rotating shaft of the rotary actuator 2 as the center. Because the light-emitting units 11 occupy a certain area and there is a certain gap between the adjacent light-emitting units 11, the number of light-emitting units 11 that can be arranged in a radius direction is limited, and thus the accuracy of the illumination light shape or the display resolution of the vehicle lighting device are limited. By distributing the light-emitting units 11 at different positions in a scattered manner, there can be more light emitting-units 11 arranged on different rotation radii, and the light-emitting units 11 on different radii are controlled specially to achieve an effect equivalent to increasing the arrangement density of the light-emitting units 11 on the same radius, which can effectively improve the irradiation accuracy or display resolution of the vehicle lighting device to break through the package volume and arrangement distance limitations of the light-emitting units 11, thus obtaining a higher resolution of the light shape.

Figure 4:
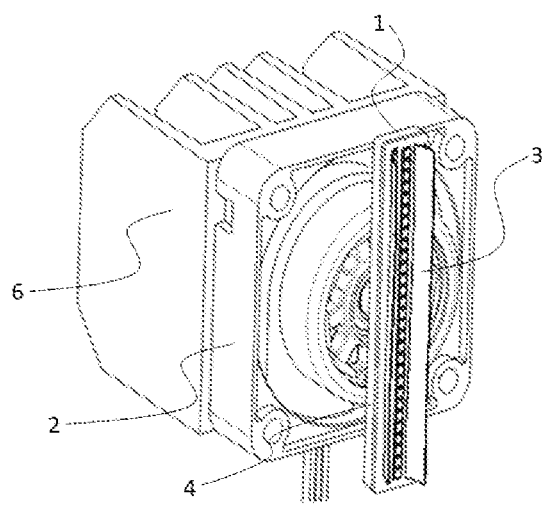
FIG. 4 is a schematic diagram of arrangement of two groups of light-emitting units in a diameter direction in a vehicle lighting device of the present disclosure.
Figure 5:
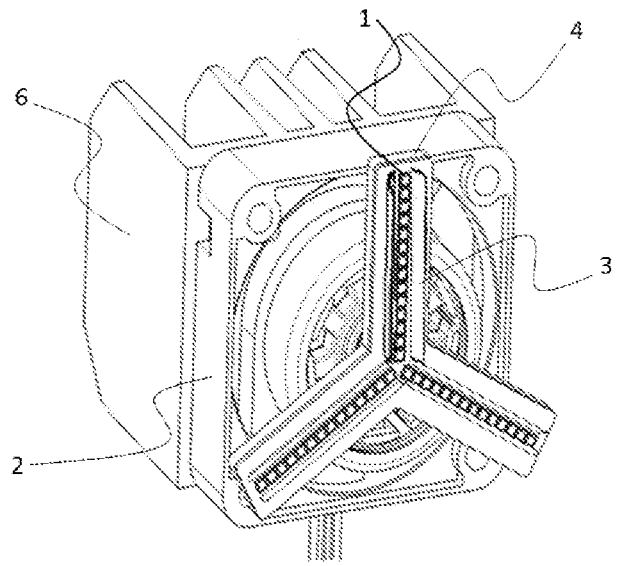
FIG. 5 is a schematic diagram of symmetrical arrangement of three groups of light-emitting units in a diameter direction in a vehicle lighting device of the present disclosure.
Figure 6:
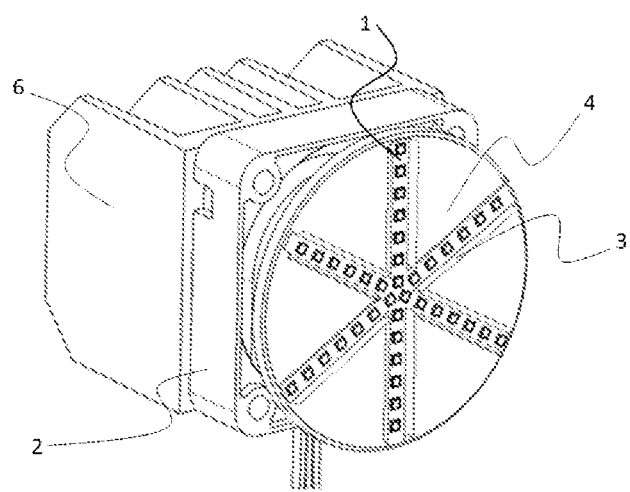
FIG. 6 is a schematic diagram of symmetrical arrangement of multiple groups of light-emitting units in a diameter direction in a vehicle lighting device of the present disclosure.
Figure 7:
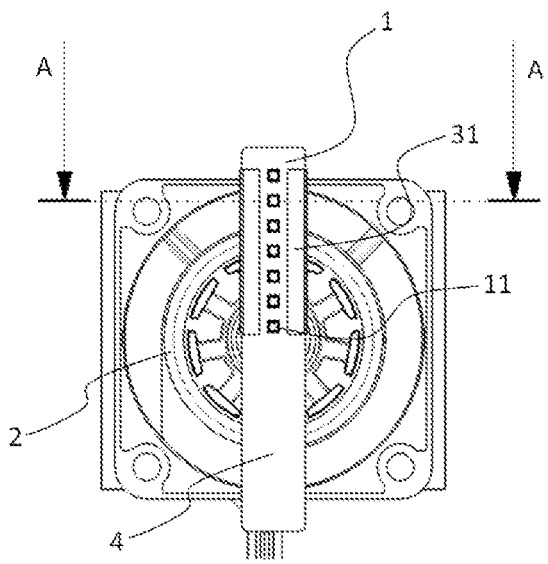
FIG. 7 is a schematic diagram of an embodiment in which a light distribution element is reflectors in a vehicle lighting device of the present disclosure.
Figure 8:
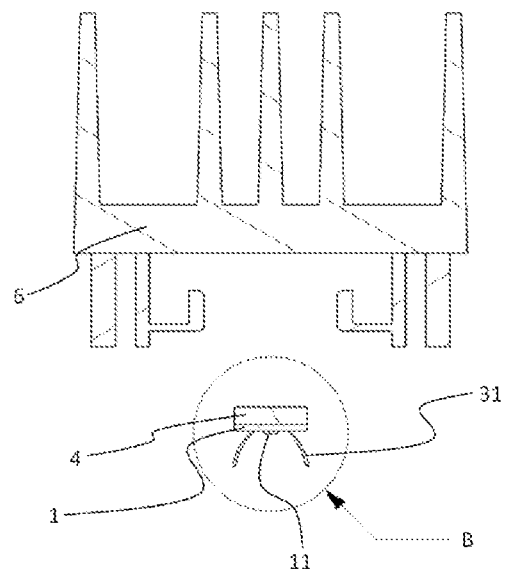
FIG. 8 is a section view along a direction A-A in FIG. 7.
Figure 9:
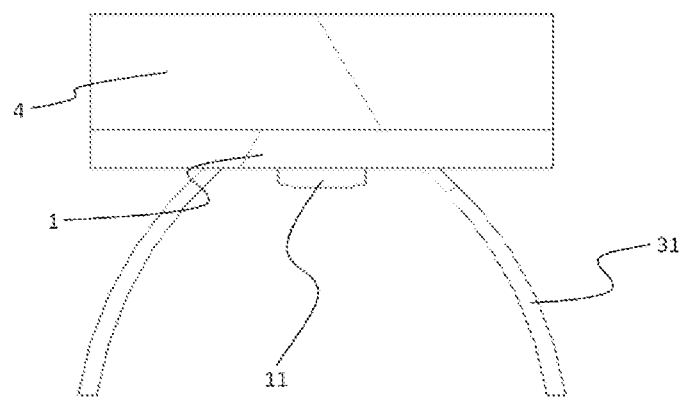
FIG. 9 is a partial enlarged view of a part B in FIG. 8.

In some embodiments of the vehicle lighting device of the present disclosure, as shown in FIGS. 4 to 6, the light-emitting units 11 of the light source 1 are divided into two or more than two groups, the groups are installed in different areas of the rotation plane of the rotary actuator 2, and the light-emitting units 11 in each group have different rotation radii. The light-emitting units 11 among different groups may have same rotation radius, or may also have different rotation radii, but in the case of same rotation radius, usually the numbers of the light-emitting units 11 in the various groups are equal, and the corresponding light-emitting units 11 have the same rotation radius. The light-emitting units 11 in each group may be arranged linearly along a radius of the rotation circle of the rotary actuator 2, and may also be arranged in other arrangement manners in different areas of the rotation plane of the rotary actuator 2, for example, the light-emitting units 11 may also be arranged in various manners of being arranged from the center of the circle to the circumference, such as an inclined arrangement manner, and an involute arrangement manner, and the relative positions of the light-emitting units 11 on the circumference may also be various to enrich the lighting and/or signaling functions of the vehicle lighting device of the present disclosure.

As an embodiment of the vehicle lighting device of the present disclosure, as shown in FIGS. 4 to 6, the plurality of light-emitting units 11 are divided into at least two groups, and the corresponding light-emitting units 11 in each group are arranged symmetrically on a rotation circumference of the rotary actuator 2. For example, as shown in FIG. 4, the light-emitting units 11 of the light source 1 are arranged linearly along a line segment with the rotating shaft of the rotary actuator 2 as the midpoint, that is, the light-emitting units 11 are arranged on two symmetrical radii of the rotation circle generated by rotation of the light source 1 around the rotating shaft of the rotary actuator 2. Alternatively, as shown in FIG. 5, the light-emitting units 11 of the light source 1 are arranged along three equal-length line segments which start from the rotating shaft of the rotary actuator 2, and are spaced by 120° in sequence, that is, the light-emitting units 11 are arranged on three centrosymmetric radii of the rotation circle generated by rotation of the light source 1 around the rotating shaft of the rotary actuator 2. Alternatively, as shown in FIG. 6, a round mounting plate 4 is provided, and the center of a circle of the mounting plate 4 is fixed on the rotating shaft of the rotary actuator 2, and the light source 1 are arranged on 6 symmetrical radii of the rotation circle of the rotary actuator 2 from the center of the mounting plate 4 to the circumferential direction. The arrangement of the light emitting units 11 on the symmetrical radii can ensure the balance of the light source 1 in the rotating state, and achieves convenient programming of the controller. In this state, the rotary actuator 2 only needs to rotate one-half (the light-emitting units 11 are located on two radii) or one-third (the light-emitting units 11 are located on three radii) circle to enable the light-emitting units 11 to cover the entire rotation circle, and the rotary actuator 2 rotates for one circle, so that the light-emitting units 11 can perform scanning three times on the same circumference, and the brightness of the vehicle lighting device is greatly improved, while the accuracy or resolution remains unchanged.

In some embodiments of the vehicle lighting device of the present disclosure, as shown in FIGS. 1 and 2, the vehicle lighting device of the present disclosure is also provided with a lens 5. The lens 5 is used to project light emitted by the light source 1 to form a specific light shape. The use of the lens 5 enables the light shape formed by the vehicle lighting device of the present disclosure to be projected over a longer distance. The light source 1 is usually arranged near the focus of the lens 5 to form a clearer projected light shape. The lens may be made of glass, plastic, rubber, or the like; and the lens may adopt a plano-convex lens as shown in FIGS. 1 and 2, or a biconvex lens, or a lens group formed combining several lenses. Usually, an optical axis of the lens 5 is parallel to the rotating shaft of the rotary actuator 2. Preferably, the optical axis of the lens 5 and the rotating shaft of the rotary actuator 2 are on a same straight line. When the optical axis of the lens 5 and the rotating shaft of the rotary actuator 2 are on the same straight line, light emitted by the light source 1 is projected directly in front of the lens, and the deformation of the light shape is relatively slight. The optical axis of the lens 5 is parallel to but deviates from the rotating shaft of the rotary actuator 2 in order to adjust the position of the light shape and the junction between the light shapes of various parts. The deviation therebetween is not too great, and is generally a deviation in the order of millimeters. Based on an imaging principle of the lens, in the use of the lens 5, the light shape projected on the road is opposite to the light shape emitted by the light source 1, and the program for the controller to control the light emitting units 11 to turn on and off needs to be recompiled.

Figure 10:
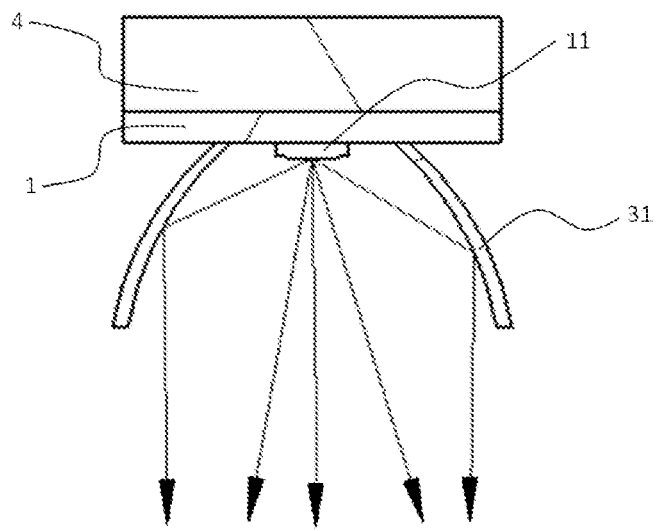
FIG. 10 is a schematic diagram of an optical path of FIG. 9.
Figure 11:
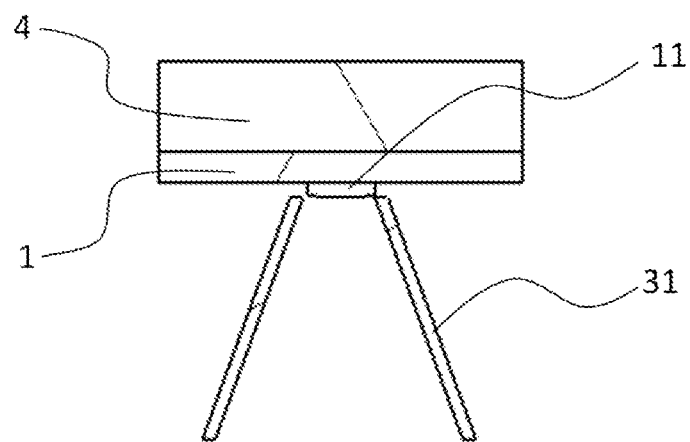
FIG. 11 is a schematic diagram of an embodiment in which another light distribution element is reflector in a vehicle lighting device of the present disclosure.
Figure 12:
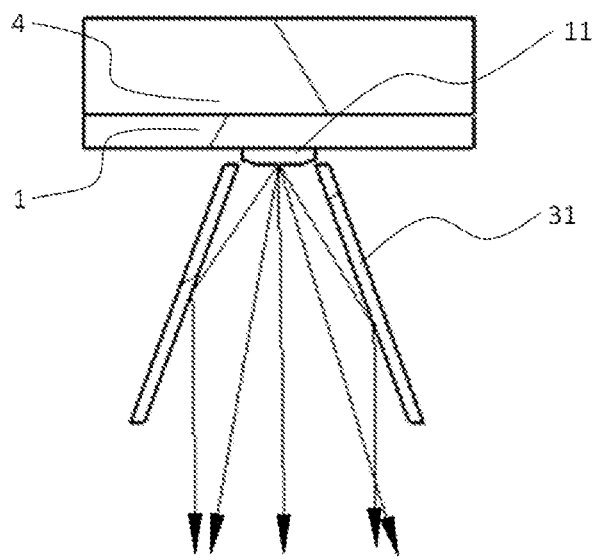
FIG. 12 is a schematic diagram of an optical path of FIG. 11.

In some embodiments of the vehicle lighting device of the present disclosure, as shown in FIGS. 7 to 12, the light distribution element 3 is reflectors 31 arranged in areas on two sides of the light-emitting units 11. The reflectors 31 are arranged on the two sides of the light-emitting units 11 to limit light emitted by the light-emitting units 11 to be within a certain range. As shown in FIGS. 10 and 12, large-angle scattered light emitted by the light-emitting units 11 is irradiated to the reflectors 31, and reflected by the reflectors 31 to a direction in front of the light-emitting units 11, so that light emitted by the light-emitting units 11 is converged in a certain range in front of the light-emitting units 11, thereby reducing the scattering of light from the light-emitting units 11, and improving the light shape brightness and display accuracy of the vehicle lighting device. The reflectors 31 may be arranged on the light source 1, or may also be arranged on the mounting plate 4 used to mount the light source 1. A set of reflectors 31 may be arranged on the two sides of each light-emitting unit 11, or a set of reflectors 31 may also be arranged on the two sides of the plurality of light-emitting units 11.

In some embodiments of the vehicle lighting device of the present disclosure, as shown in FIGS. 7 to 10, reflective surfaces of the reflectors 31 are curved surfaces. The curved reflective surfaces can better control a reflection direction of reflected light and increase the convergence degree of light emitted by the light-emitting units 11. In some other embodiments of the vehicle lighting device of the present disclosure, as shown in FIGS. 11 and 12, the reflective surfaces of the reflectors 31 are planar surfaces. The planar reflective surfaces are simple in structure and convenient to process, and can also achieve the purpose of reflecting large-angle scattered light emitted by the light-emitting units 11 to increase the convergence degree of light emitted by the light-emitting units 11. Each reflector 31 may be arranged on a side of the plurality of light-emitting units 11. When the light-emitting units 11 are grouped, a reflector 31 may be arranged on each of two sides of each group. The arrangement of a set of reflectors 31 on the side of the plurality of light-emitting units 11 can reduce the number of the reflectors 31 and improve the stability of the vehicle lighting device.

In some embodiments of the vehicle lighting device of the present disclosure, as shown in FIGS. 13 to 24, the light distribution element 3 is a condenser 32 arranged in a light emergent surface area of the light-emitting units 11. The condenser 32 is mostly a transparent entity made of a transparent material, and may be made of materials such as plastic or silica gel, preferably PMMA or PC. The condenser 32 has a light incident surface and a light emergent surface, and may have a plurality of light incident surfaces and/or light emergent surfaces, and each light incident surface and/or light emergent surface may correspond to one or more light-emitting units 11. Light emitted by the light-emitting units 11 is introduced to the condenser 32 from the light incident surface of the condenser 32, is converged and deployed by the condenser 32, and is emitted from the light emergent surface of the condenser 32, to increase the convergence degree of light emitted by the light-emitting units 11, and improve the luminous efficacy of illumination and the clarity of the light shape.

In some embodiments of the vehicle lighting device of the present disclosure, as shown in FIGS. 13 to 24, each condenser 32 is arranged in the light emergent surface area of the plurality of light-emitting units 11. One condenser 32 may be provided for all the light-emitting units 11 of the vehicle lighting device, or a plurality of light-emitting units 11 may be grouped, with one condenser 32 being provided for each group. One condenser 32 may also be provided for a plurality of light-emitting units 11 in each area. By arranging one condenser 32 for the plurality of light-emitting units 11 can reduce the number of condensers 32 in the vehicle lighting device and improve the stability of the vehicle lighting device.

Figure 13:
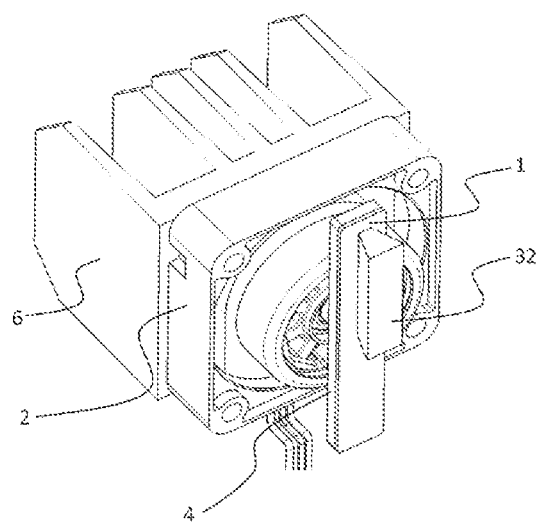
FIG. 13 is a schematic diagram of an embodiment in which a light distribution element is a condenser in a vehicle lighting device of the present disclosure.
Figure 14:
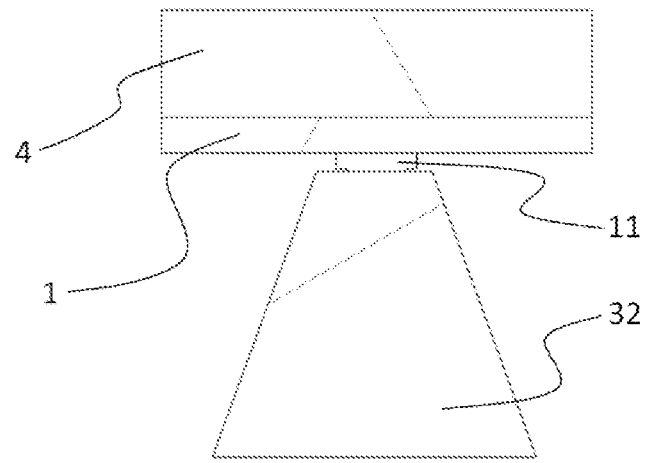
FIG. 14 is a section view of a condenser part of FIG. 13.
Figure 15:
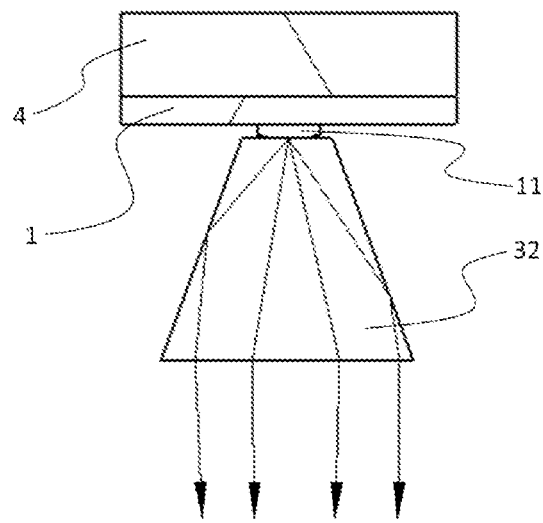
FIG. 15 is a schematic diagram of an optical path of FIG. 14.

As an embodiment of the vehicle lighting device of the present disclosure, as shown in FIGS. 13 to 15, the condenser 32 is a strip-like transparent device with a cross section in the shape of an isosceles trapezoid, and a surface of the transparent device on which an upper base of the isosceles trapezoid is located is the light incident surface of the condenser 32. The light incident surface of the condenser 32 may be arranged in proximity to the light emergent surfaces of the light-emitting units 11, so that light emitted by the light-emitting units 11 is more introduced into the condenser 32. A surface on which a lower base of the isosceles trapezoid is located is the light emergent surface of the condenser 32. Light emitted by the light-emitting units 11 is refracted by the transparent device and reflected by two sides on which two legs of the isosceles trapezoid of the transparent device are located to form light which has higher convergence and is emitted from the light emergent surface of the condenser 32.

Figure 16:
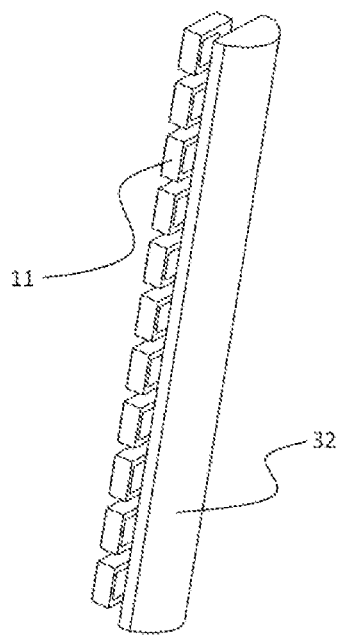
FIG. 16 is a schematic diagram of a condenser part of a vehicle lighting device of the present disclosure.
Figure 17:
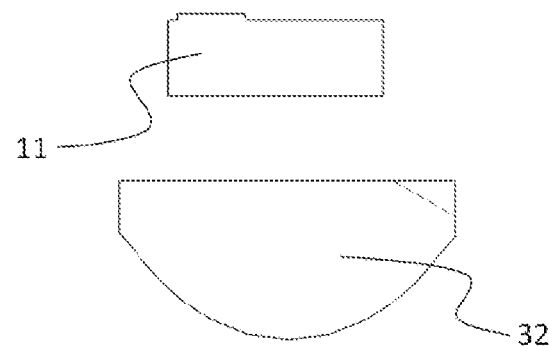
FIG. 17 is a section view of the condenser part of FIG. 16.
Figure 18:
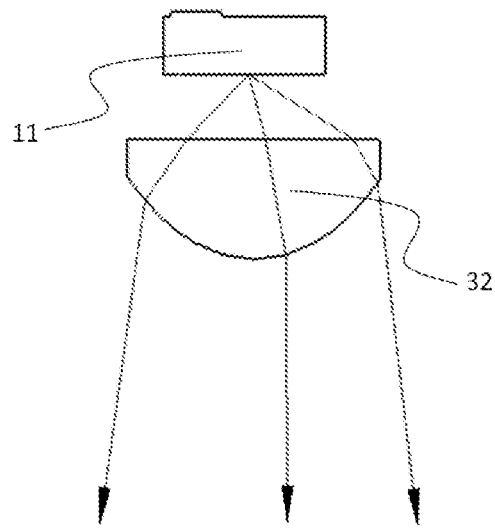
FIG. 18 is a schematic diagram of an optical path of FIG. 17.

As an embodiment of the vehicle lighting device of the present disclosure, as shown in FIGS. 16 to 18, the condenser 32 is a transparent cuboid device with a cylindrical surface. At this time, the condenser 32 is equivalent to a long cylindrical plano-convex lens. The cylindrical plano-convex lens has an axial meridian parallel to a long axis of a cylindrical surface and a refractive power meridian perpendicular to the long axis of the cylindrical surface. The cylindrical surface of the condenser 32 is the light emergent surface of the condenser 32, and a surface, opposite to the cylindrical surface, of the condenser is the light incident surface of the condenser 32. The condenser 32 is arranged in such a position that the axial meridian of the condenser 32 is in the same direction as the arrangement direction of the light-emitting units 11 and the light-emitting units 11 are located near a focal line of the cylindrical plano-convex lens. When passing through the condenser 32, light emitted by the light-emitting units 11 is converged in the direction of the refractive power meridian of the cylindrical plano-convex lens, while no change occurs in the convergence and divergence in the direction of the axial meridian. This increases the convergence degree of light emitted by the light-emitting units 11 and increases the clarity and the luminous efficacy of the light shape formed by the vehicle lighting device.

Figure 19:
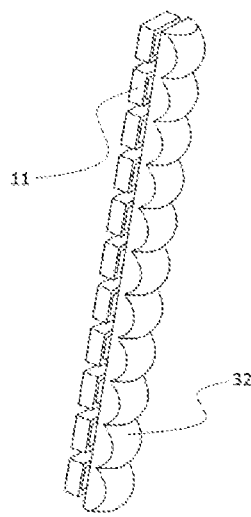
FIG. 19 is a schematic diagram of another condenser part of a vehicle lighting device of the present disclosure.
Figure 20:
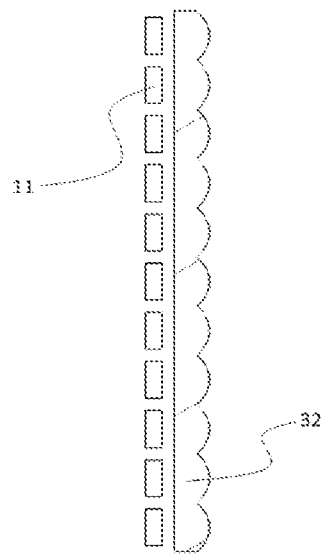
FIG. 20 is a section view of the condenser part of FIG. 19.
Figure 21:
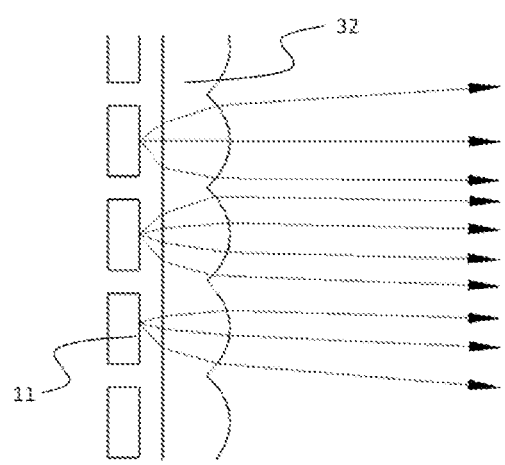
FIG. 21 is a schematic diagram of an optical path of FIG. 20.

As an embodiment of the vehicle lighting device of the present disclosure, as shown in FIGS. 19 to 21, the condenser 32 is a plurality of integrally formed plano-convex lenses, wherein planar surfaces of the plurality of plano-convex lenses face a same direction to form the light incident surface of the condenser, and convex surfaces of the plurality of plano-convex lenses form the light emergent surface of the condenser. The number of the plano-convex lenses is equal to the number of the light-emitting units 11. The arrangement direction of the plurality of plano-convex lenses is same as the arrangement direction of the light-emitting units 11, and the light-emitting units 11 are located near focuses of the corresponding plano-convex lenses, respectively. When light emitted by the light-emitting units 11 passes through the corresponding plano-convex lenses, light in various directions is converged to form substantially parallel emergent light, resulting in a significant increase in the clarity and brightness of the light shape formed by the vehicle lighting device.

Figure 22:
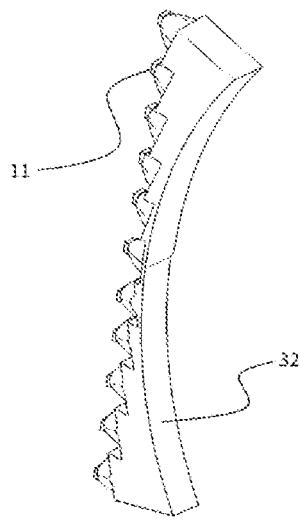
FIG. 22 is a schematic diagram of yet another condenser part of a vehicle lighting device of the present disclosure.
Figure 23:
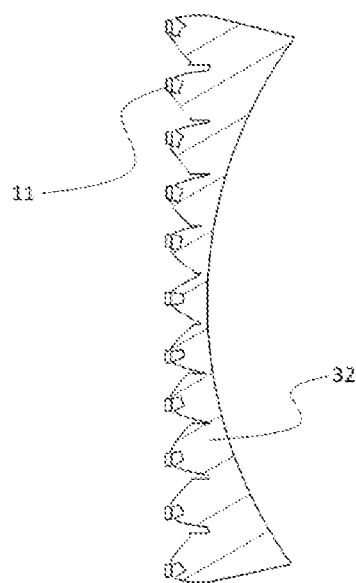
FIG. 23 is a section view of the condenser part of FIG. 22.
Figure 24:
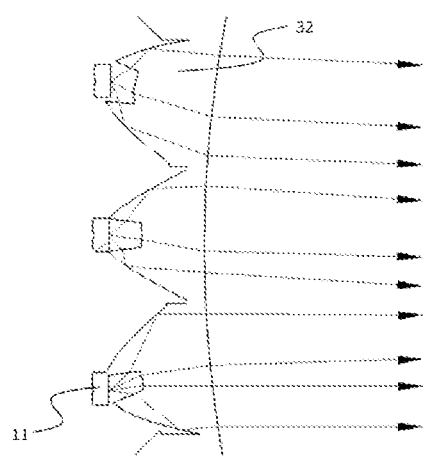
FIG. 24 is a schematic diagram of an optical path of FIG. 23.

As an embodiment of the vehicle lighting device of the present disclosure, as shown in FIGS. 22 to 24, the condenser 32 is a plurality of integrally formed light concentrators. The structures of the light concentrators may be same as the structures of light concentrators generally used in an existing vehicle lamp. The number of the light concentrators is equal to the number of the light-emitting units 11, and the arrangement direction of the plurality of condensers is same as the arrangement direction of the light-emitting units 11. The plurality of light-emitting units 11 are arranged at light incident surfaces of the corresponding light concentrators, respectively, and light emergent surfaces of the plurality of light concentrators may form a same smooth surface. The smooth surface may be a planar surface or a curved surface. Light emitted by the light-emitting units 11 is modulated and transferred by the corresponding light concentrators to form light with higher convergence degree, which is emitted from the light emergent surfaces of the light concentrators. This increases the clarity of the formed light shape and the illuminating brightness of the vehicle lighting device.

Figure 25:
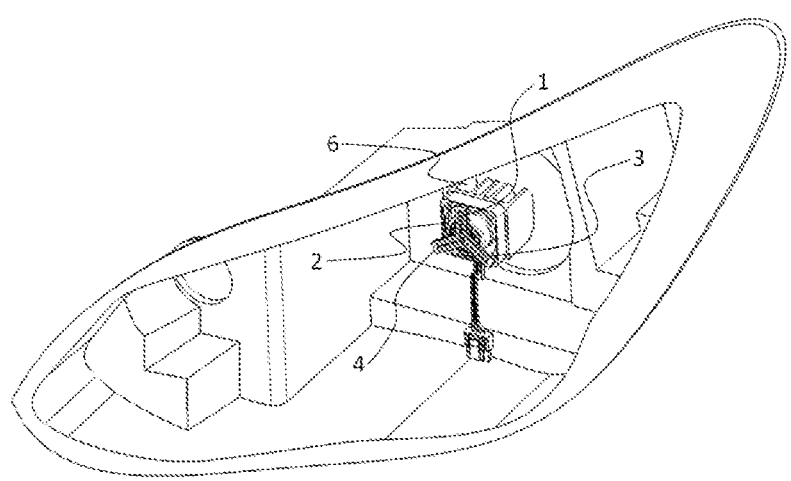
FIG. 25 is a schematic diagram of use of a vehicle lighting device of the present disclosure in a vehicle lamp.

One form of arrangement of the vehicle lighting device of the present disclosure in a vehicle lamp is as shown in FIG. 25, the vehicle lighting device is mounted in a housing of the vehicle lamp by means of the bracket 6, and the light source 1 is driven by the rotary actuator 2 to rotate in the housing of the vehicle lamp in a certain direction. The controller (not shown in the figure) controls the light-emitting units 11 to be turned on and off at different moments according to the rotational direction and the rotational speed of the rotary actuator 2. When the light-emitting units 11 keep the same on/off state at the same position of the rotation circle, the vehicle lighting device of the present disclosure can form a light shape with a fixed pattern; and if an on/off state of the light-emitting units 11 at the same position of the rotation circle changes slowly according to a certain rule, the vehicle lighting device of the present disclosure can form a light shape with an animated pattern. When the light-emitting units 11 emit light with different colors, a light shape with a color pattern may be formed. The use of the lens 5 may also achieve relatively-long-distance projection of the light shape formed by the vehicle lighting device of the present disclosure. The vehicle lighting device of the present disclosure may be used as an illumination tool for a vehicle traveling on the road and used as an alerting tool for emitting various vehicle driving signals. Specifically, it may be used as a strong illuminating lamp for passing beams or driving beams, but may also be used as a signal lamp such as a tail lamp, and any of various animation-type or projection-type interactive lamps.

Figure 26:
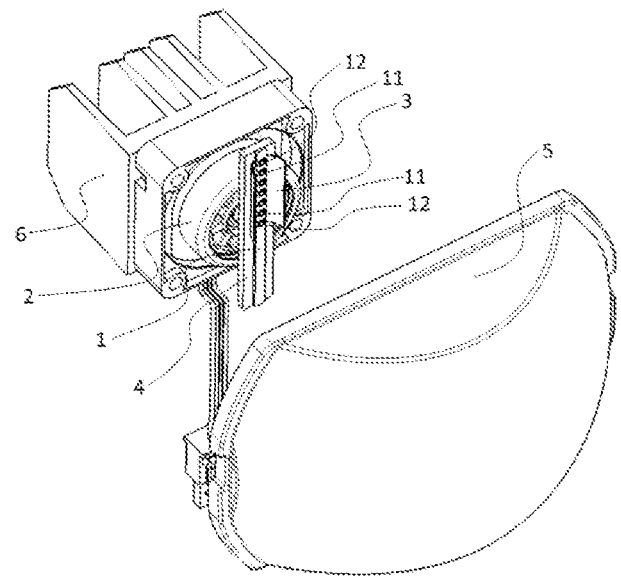
FIG. 26 is a three-dimensional structure diagram of an embodiment of an invisible light projection device of the present disclosure.
Figure 27:
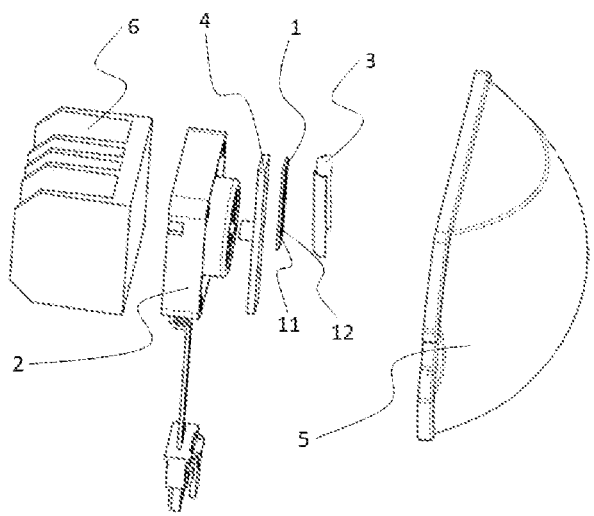
FIG. 27 is an exploded diagram of components of an embodiment of an invisible light projection device of the present disclosure.
Figure 28:
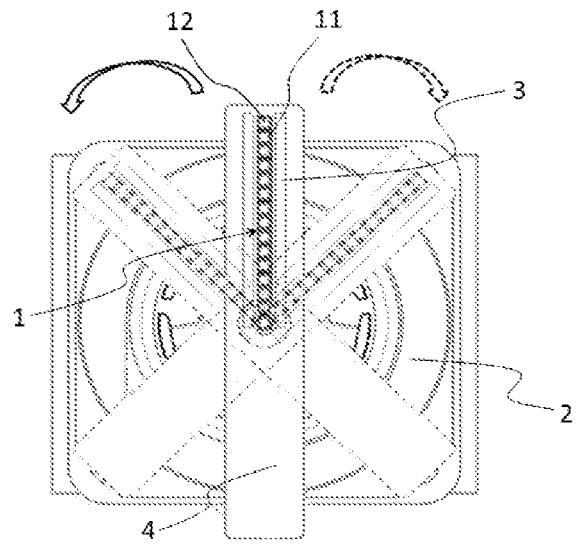
FIG. 28 is a schematic diagram of a rotating state of an embodiment of an invisible light projection device of the present disclosure.

In an embodiment, a vehicle invisible light projection device in the present disclosure, as shown in FIGS. 26 and 27, includes a light source 1, a rotary actuator 2 and a controller. The light source 1 is provided with invisible light-emitting elements 12. The invisible light-emitting elements 12 may be infrared LEDs, infrared laser diodes, or radar emitters. The rotary actuator 2 may be mounted on a bracket 6 and fixed on the housing of the vehicle lamp by means of the bracket 6. As shown in FIG. 28, the rotary actuator 2 is a rotary device, which may select a rotary drive device capable of rotating at a high speed and feeding back a rotating state, such as a DC motor with a rotational speed feedback electrode, and may also select a rotary drive device with precise rotational speed control, such as a servo motor. The light source 1 is mounted on a rotating shaft of the rotary actuator 2, and when the rotary actuator 2 rotates, the light source 1 can be driven to rotate with the rotating shaft of the rotary actuator 2. The controller is electrically connected to the rotary actuator 2 and can control the rotational speed of the rotary actuator 2, and may also receive rotational speed information and rotational position information fed back by the rotary actuator 2. The controller is also electrically connected to the invisible light-emitting elements 12 and can control the invisible light-emitting elements 12 to emit light and stop emitting light at different time respectively according to the rotational speed information and rotational position information of the rotary actuator 2, to achieve light-emitting states of the invisible light-emitting elements 12 at different rotation positions. Irradiation of invisible light emitted by the invisible light-emitting elements 12 at different rotation positions is superimposed within certain time to create light distribution of invisible light with a certain distribution pattern. If the invisible light-emitting elements 12 are in the same light-emitting state at the same position of rotation within a certain time, invisible light emitted by the elements irradiate to create light distribution of invisible light with a specific distribution pattern fixed in a period of time. The distribution pattern of the formed invisible light distribution may be changed by changing the light-emitting state of the invisible light-emitting elements 12 at a specific rotational position. The rotary actuator 2 may rotate counterclockwise or may also rotate clockwise, and the light source 1 rotates in the same direction with the rotary actuator 2. The light source 1 may be powered by adopting an existing device that may supply power in a rotating state, for example, a conductive slip ring is adopted to supply power to the light source 1. The controller may use a 51-series single chip microcomputer that is widely used currently, an MCS-51 single chip microcomputer is used in this embodiment, its control and programming methods are well known to those skilled in the related art, and are not improved in the present disclosure, and thus are not described in detail herein.

In some embodiments of the vehicle invisible light projection device in the present disclosure, as shown in FIGS. 26 and 27, a mounting plate 4 is installed on the rotating shaft of the rotary actuator 2, and the light source 1 is arranged on the mounting plate 4. The mounting plate 4 can provide higher mounting strength for the light source 1 and can prevent the light source 1 from vibrating during high-speed rotation, which affects the stability of invisible light irradiation.

Figure 29:
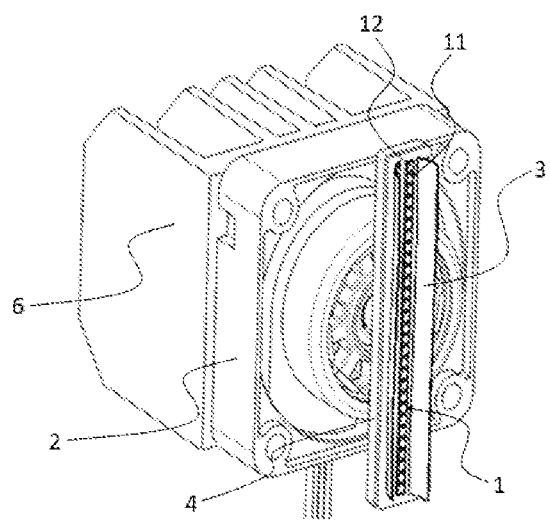
FIG. 29 is a schematic diagram of arrangement of two groups of light-emitting units in a diameter direction in an invisible light projection device of the present disclosure.
Figure 30:
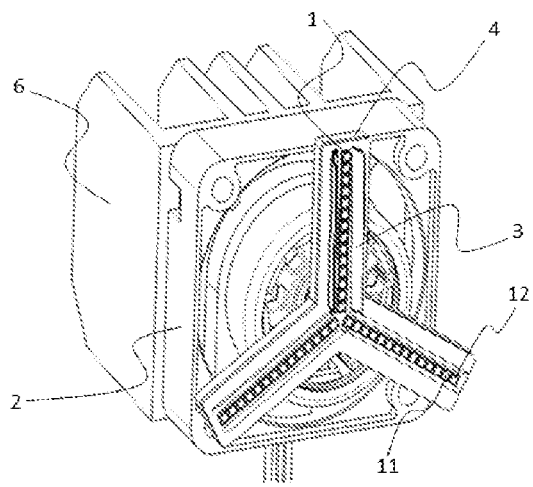
FIG. 30 is a schematic diagram of symmetrical arrangement of three groups of light-emitting units in diameter directions in an invisible light projection device of the present disclosure.
Figure 31:
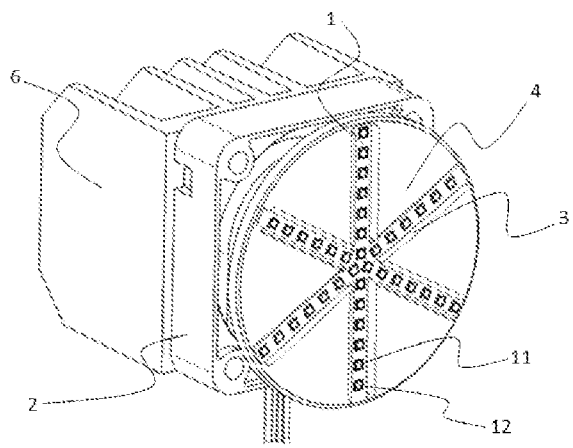
FIG. 31 is a schematic diagram of symmetrical arrangement of multiple groups of light-emitting units in diameter directions in an invisible light projection device of the present disclosure.
Figure 32:
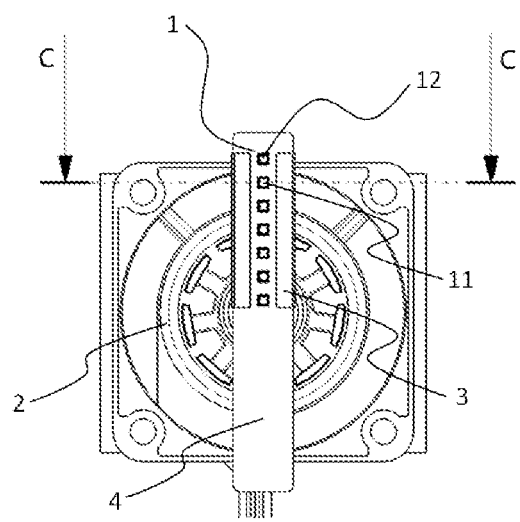
FIG. 32 is a schematic diagram of an embodiment in which a light distribution element is reflectors in an invisible light projection device of the present disclosure.

In some embodiments of the vehicle invisible light projection device in the present disclosure, as shown in FIGS. 26 and 27, the light source 1 is provided with a plurality of invisible light-emitting elements 12, and the plurality of invisible light-emitting elements 12 are located on different rotation radii of the rotary actuator 2. The present disclosure does not limit the specific arrangement manner of the plurality of invisible light-emitting elements 12 which may be arranged in various possible manners. The plurality of invisible light-emitting elements 12 may be arranged in a straight line on a side of the rotating shaft of the rotary actuator 2, as shown in FIG. 28, may be arranged on a straight line that passes through the rotating shaft of the rotary actuator 2, as shown in FIG. 29, may also be arranged on a plurality of radii uniformly distributed on a rotation plane of the rotary actuator 2, as shown in FIG. 30, or may be arranged on a plurality of diameters uniformly distributed on the rotation plane of the rotary actuator 2, as shown in FIG. 31. When the mounting plate 4 is used, the mounting plate 4 may also be designed into different shapes, such as a rectilinear, furcated or circular shape, depending on different arrangement manners of the invisible light-emitting elements 12.

Figure 36:
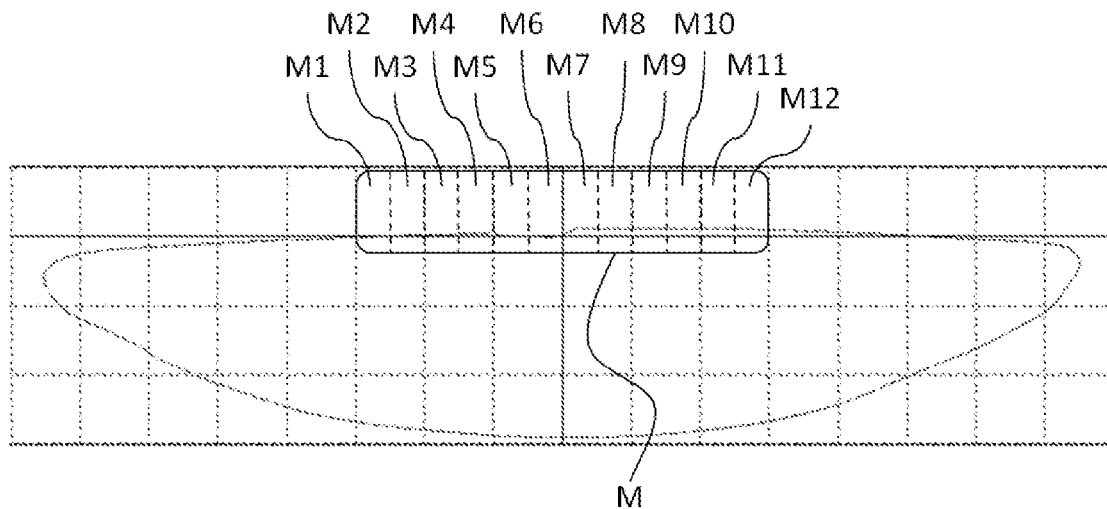
FIG. 36 is a schematic diagram of a visible light distribution of an invisible light projection device of the present disclosure.

In some embodiments of the vehicle invisible light projection device in the present disclosure, as shown in FIGS. 26 and 27, the light source 1 further includes light-emitting units 11. The controller is also electrically connected to the light-emitting units 11 and can control light-emitting states of the light-emitting units 11 respectively. The controller can control the light-emitting units 11 to emit light and go out at different time respectively according to the rotational speed information and rotational position information fed back by the rotary actuator 2, to achieve light-emitting states of the light-emitting units 11 at different rotation positions. At different time, light emitted by the light-emitting units 11 at different rotation positions may form different illumination areas, and due to the visual staying principle, different illumination areas are combined to form specific visible light distribution patterns, to adapt to lighting requirements for the vehicle in different driving environments. The illumination area here refers to an area that can be illuminated by the irradiation of the light-emitting units 11 in a certain period of time. As shown in FIG. 36, an irradiation range formed by light emitted by the light-emitting units 11 is a visible light irradiation area M, the visible light irradiation area M includes illumination areas M1-M12 formed by light emitted by the light emitting units 11 at different rotation positions (that is, in different periods of time), and the brightness and darkness of the illumination areas M1-M12 can be independently controlled. A visible light distribution formed when the illumination areas M1-M12 are all bright is the visible light irradiation area M, and different brightness-darkness combinations of the illumination areas M1-M12 form different visible light distributions.

Figure 38:
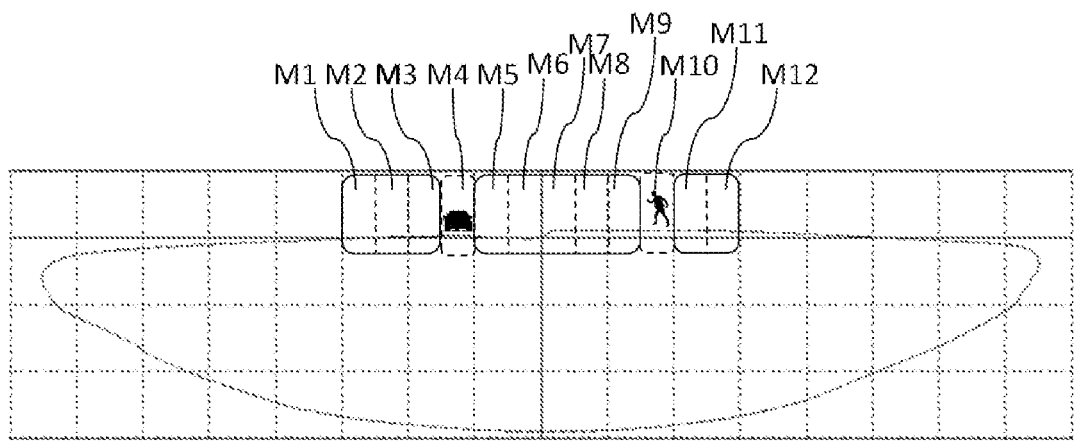
FIG. 38 is a schematic diagram of a visible light distribution with illumination dark areas of an invisible light projection device of the present disclosure.

In some embodiments of the vehicle invisible light projection device in the present disclosure, an irradiation range that can be formed by invisible light emitted by the invisible light-emitting elements 12 on the vehicle invisible light projection device in the present disclosure can at least cover the irradiation range that can be formed by visible light emitted by the light-emitting units 11. In this way, whichever area within the irradiation range of visible light forms an illumination dark area due to a need in a road driving environment, the vehicle invisible light projection device in the present disclosure can emit invisible light to form invisible light irradiation in the illumination dark area, in order to be able to monitor conditions that may affect driving safety in the illumination dark area and improve the vehicle driving safety. As shown in FIG. 38, when other road users are present in some illumination areas (such as M4 and M10 in FIG. 38) within the visible light irradiation area M formed by the light-emitting units 11, in order to prevent light from dazzling other road users, specific light-emitting units 11 need to be controlled to be turned off at a specific rotational position to form illumination dark areas in the illumination areas (such as M4 and M10 in FIG. 38). However, the existence of the illumination dark areas also influence an observation range of a driver of the vehicle, and form a safety hazard, and thus invisible light irradiation needs to be formed in the illumination area by the invisible light-emitting elements 12, in order to be able to monitor the safety state of the illumination dark areas by using a detection device and improve the driving safety.

Figure 37:
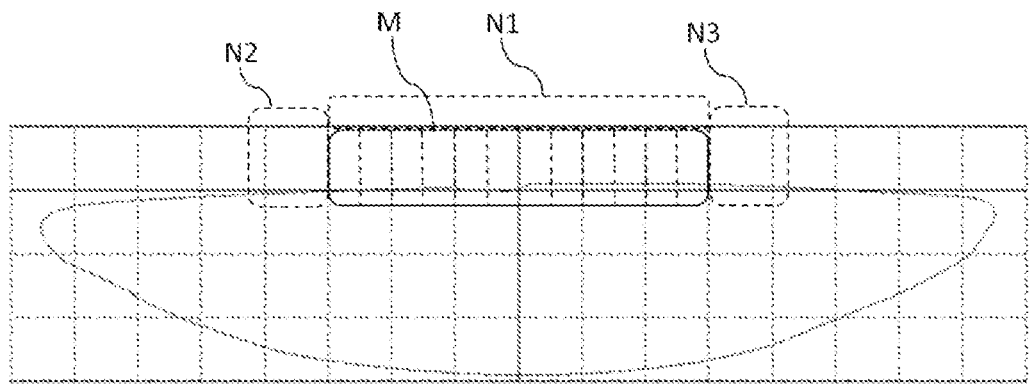
FIG. 37 is a schematic diagram of separate invisible light irradiation areas outside a visible light distribution of an invisible light projection device of the present disclosure.

In some embodiments of the vehicle invisible light projection device in the present disclosure, as shown in FIG. 37, visible light emitted by the light-emitting units 11 in the vehicle invisible light projection device of the present disclosure forms a visible light irradiation area M, and invisible light emitted by the invisible light-emitting elements 12 therein can form a separate invisible light irradiation area N1 in front of the visible light irradiation area M, and can form separate invisible light irradiation areas N2 and N3 respectively on a left side and a right side of the visible light irradiation area M. With the separate invisible light irradiation area N1, road conditions at a greater distance in front of the vehicle can be detected by using a detection device, to discover a situation on the road at a greater distance that cannot be observed by the driver, without affecting the driving safety of opposite vehicles. With the separate invisible light irradiation areas N2 and N3, conditions in a wider range of the left side and the right side of the vehicle can be detected by using the detection device, thereby expanding the range that can be observed by the driver of the vehicle and improving the vehicle driving safety. The use effect is particularly obvious especially when the vehicle travels at night and the field of vision of the driver of the vehicle is limited.

In some embodiments of the vehicle invisible light projection device in the present disclosure, as shown in FIGS. 26 and 27, a lens 5 is arranged on a light emergent path of the vehicle invisible light projection device. Invisible light emitted by the invisible light-emitting elements 12 is converged by the lens 5 to be projected to form an invisible light distribution pattern. Light emitted by the light-emitting units 11 may also be converged by the lens 5 to be projected to form a clearer light shape of the visible light distribution. By the convergence by the lens 5, the invisible light distribution pattern and the light shape of the visible light distribution can also be projected farther.

Figure 33:
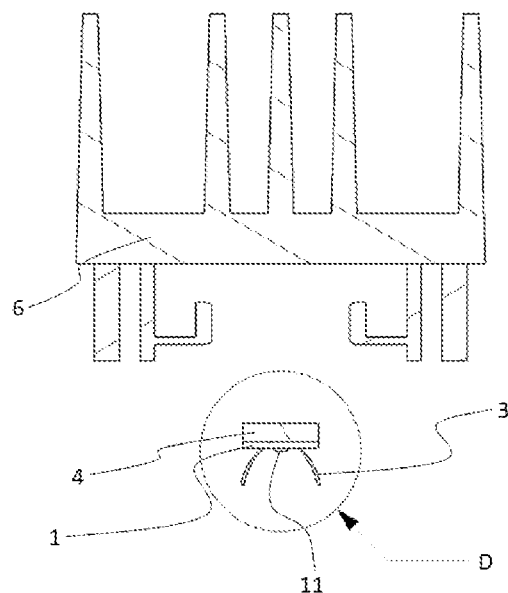
FIG. 33 is a section view along a direction C-C in FIG. 32.
Figure 34:
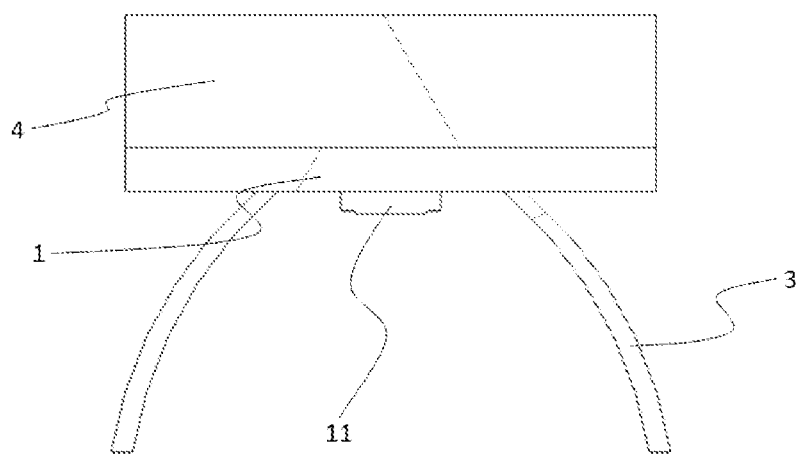
FIG. 34 is a partial enlarged view of a part D in FIG. 33.
Figure 35:
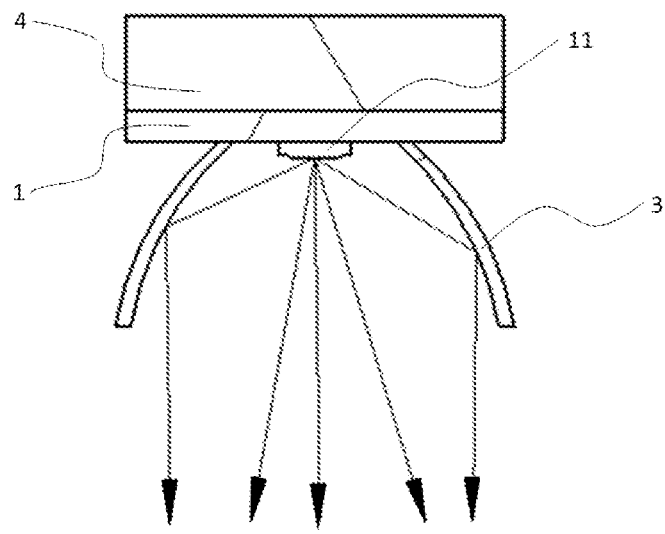
FIG. 35 is a schematic diagram of an optical path of FIG. 34.

In some embodiments of the vehicle invisible light projection device in the present disclosure, as shown in FIGS. 26 to 35, the invisible light-emitting elements 12 and/or the light-emitting units 11 are provided with a light distribution element 3. As shown in FIGS. 33 and 34, the light distribution element 3 may be reflectors arranged on two sides of the invisible light-emitting elements 12 and/or the light-emitting units 11. As shown in FIG. 35, the reflectors can reflect large-angle scattered light emitted by the invisible light-emitting elements 12 and/or the light-emitting units 11, so that emitted light is more emitted in front of the light source 1 to increase the convergence degree of the emitted light, and increase the illuminance of the formed light distribution. Of course, the light distribution element 3 may also be other optical elements which are capable of changing the light propagation direction and changing the light distribution, and arranged at a suitable position of the light source 1. For example, the condenser provided in front of the invisible light-emitting elements 12 and/or the light-emitting units 11 specifically may be a light concentrator, or may also be a converging lens with a large light incident surface, or the like. By using the condenser, light emitted by the invisible light-emitting elements 12 and/or the light-emitting units 11 can also be converged to increase the convergence degree of the emitted light and increase the illumination of the formed light distribution.

A target object detection device of the present disclosure includes an invisible light detection device capable of detecting target objects within an irradiation range of invisible light formed by the invisible light projection device of any embodiment of the present disclosure. The target objects refer to objects, pedestrians and the like on the road, wherein the objects include falling objects, and vehicles. The target object detection device may use one invisible light detection device to detect target objects within the entire irradiation range of invisible light, and may also use several invisible light detection devices to respectively detect target objects in different parts of the irradiation range of invisible light, wherein detection ranges of the several invisible light detection devices cover the entire irradiation range of invisible light. When invisible light emitted by the invisible light-emitting elements 12 used in the invisible light projection device is infrared light, the invisible light detection device of the target object detection device may be an infrared sensor such as an infrared receiving diode, or may also be an infrared camera. When the invisible light-emitting elements 12 used in the invisible light projection device are radar transmitters, the invisible light detection device of the target object detection device is a radar receiver. Through the target object detection device, a target object signal detected by the invisible light detection device may be formed into a graph/text signal to be identified by a driver, and may also be converted into an electrical signal that can be identified by the controller, to be identified and processed by the controller.

In some embodiments of the target object detection device of the present disclosure, the target object detection device also includes a visible light detection device capable of detecting target objects within an irradiation range of visible light formed by projection of the light-emitting units 11 in any embodiment of the invisible light projection device of the present disclosure. The visible light detection device may be a photosensitive detector, or may also be a camera. Of course, the visible light detection device may also be existing monitoring equipment of the vehicle. The above-mentioned target object detection device may be arranged independently on the vehicle or may also be integrated on the above-mentioned invisible light projection device of the vehicle.

Figure 39:
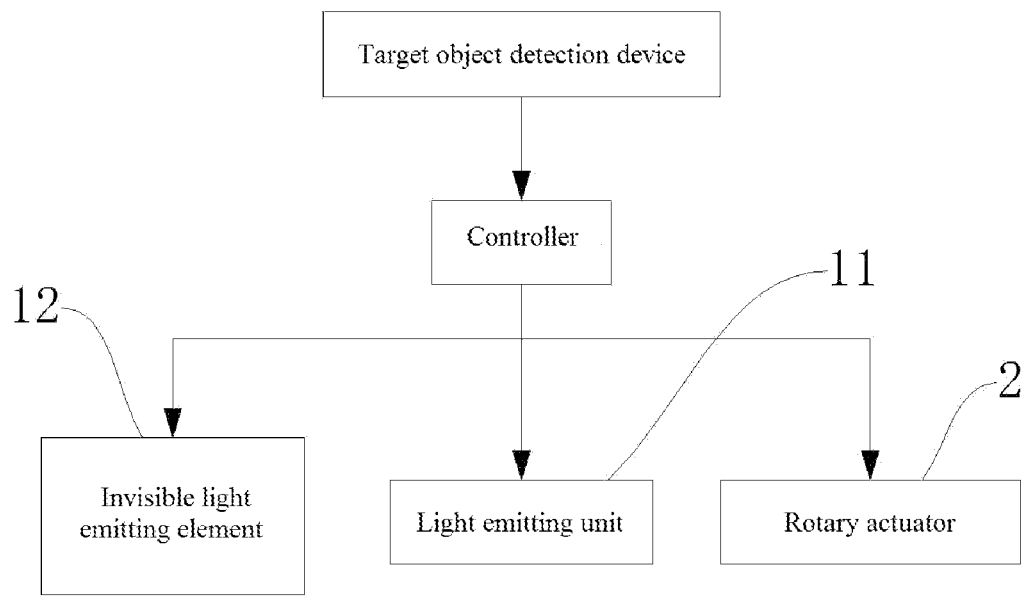
FIG. 39 is a control block diagram of use of an invisible light projection device of the present disclosure.

The invisible light projection device of the present disclosure and the corresponding target object detection device of the present disclosure may be used in cooperation on an intelligent drive automobile. The invisible light projection device may be not provided with an independent controller, and the light source 1 and the rotary actuator 2 of the invisible light projection device are cooperated and controlled by an intelligent control device on the intelligent drive automobile, and information detected by the target object detection device may be analyzed and processed by the intelligent control device. The invisible light projection device may also be provided with an independent controller, as shown in FIG. 39, and information detected by the target object detection device is transmitted to the controller which analyzes the influence of a target object on the vehicle driving safety and controls the invisible light-emitting elements 12, the light-emitting units 11 and the rotary actuator 2 to work in a cooperation manner to form the corresponding invisible light distribution and visible light distribution, to ensure the vehicle driving safety and the safety of the target object. The controller may also be connected to the intelligent control device on the intelligent drive automobile, and when necessary, the driving status of the intelligent drive automobile may also be adjusted and controlled by the intelligent control device on the intelligent drive automobile, to achieve intelligent control of the automobile and improve the safety performance of the intelligent drive automobile.

Figure 40:
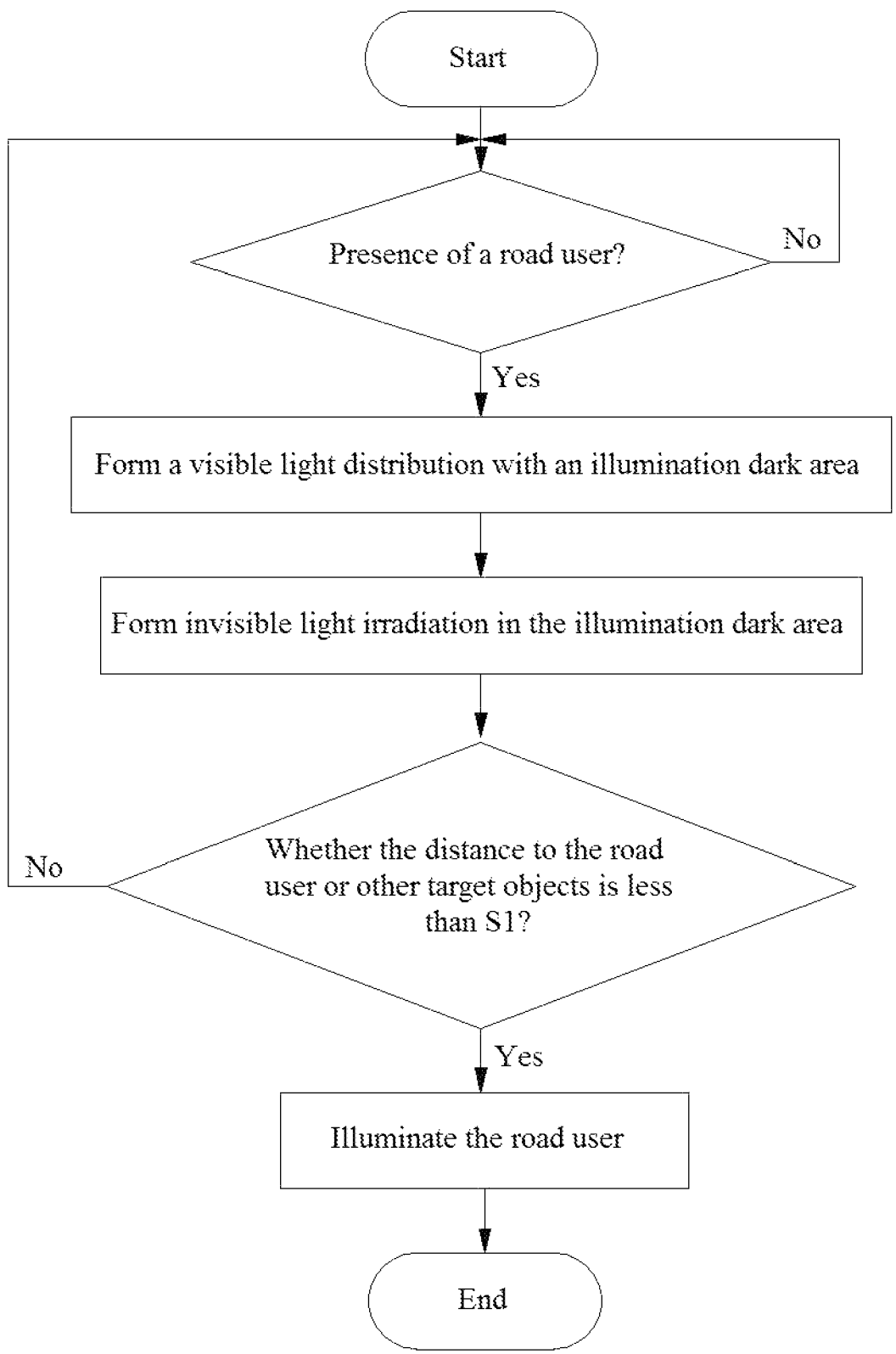
FIG. 40 is a control flow diagram of use of an invisible light projection device of the present disclosure.

A control process when the invisible light projection device of the present disclosure and the corresponding target object detection device of the present disclosure are used in the intelligent drive automobile is shown in FIG. 40: in the driving process of the automobile, the visible light detection device continuously detects target objects on the road, and when other road user is detected on the road, the controller controls light-emitting states of the light-emitting units 11 at different rotation positions according to the rotational speed of the rotary actuator 2, so that the light-emitting units 11 at the rotational position corresponding to the visible light irradiation area where the other road user is located are turned off to form an illumination dark area at the position of the other road user within the irradiation range of visible light, to prevent the visible light irradiation from affecting the vision of the other road user, so as to avoid causing discomfort to the other road user and affecting the traffic safety. As shown in FIG. 38, when an opposite vehicle is present in the illumination area M4 within the visible light irradiation area M, the light-emitting states of the light-emitting units 11 at a specific rotational position is controlled to form an illumination dark area in the illumination area M4. When a pedestrian is present in the illumination area M10 of the visible light irradiation area M, the light-emitting states of the light-emitting units 11 at a specific rotational position is controlled to form an illumination dark area in the illumination area M10. At the same time, the controller controls the light-emitting states of the invisible light-emitting elements 12 at a corresponding rotational position to form invisible light irradiation (dotted box parts shown in the figure are illuminated by invisible light) in the illumination area M4 and/or the illumination area M10 (illumination dark area), and information such as the position of other road user or other target object is detected by the invisible light detection device. When the distance of the other road user or other target object from the automobile is greater than a safety distance Si, the detection of the position and the like of the road user is continued, and the visible light illumination dark area and the invisible light irradiation position are adjusted according to the new detected information to keep the road user or other target object located within the visible light illumination dark area and the irradiation range of invisible light. When the distance of the road user or other target object from the automobile is within the safety distance Sl, the controller controls the light-emitting states of the light-emitting units 11 to illuminate the road user or other target object to attract the attention of the driver of the automobile. At the same time, the automobile may also be controlled to slow down, and, in the case that the road traffic situation allows, the automobile may also be controlled to adjust the driving direction to achieve avoidance. These measures improve the driving safety of the automobile and the intelligent driving level of the automobile. The safety distance Si may be set to be different values based on different vehicle speeds.

According to the above technical solution, in the vehicle lighting device of the present disclosure, the light source 1 having a small number of light-emitting units 11 is driven by the rotary actuator 2 to rotate, and the on/off states of the light-emitting units 11 at different moments of rotation are controlled by the controller to create different light shapes by using the visual staying principle, so that the device is relatively simple in structure and convenient for implementation. The number of the light-emitting units and primary optical elements used in the device is much less than that in a matrix headlight and that in a pixelated signal lamp, but the functions achieved are comparable to those of the matrix headlight and/or a pixelated signal lamp. The use of the light distribution element 3 increases the convergence degree of light emitted by the light-emitting units 11, reduces the waste of the large-angle scattered light and the mutual interference of light between the adjacent light-emitting units 11, and increases the brightness and clarity of the formed light shape, and each light-emitting unit 11 is in a rotating state during working, such that heat generated by light emission of the light emitting units 11 can be better transferred to the air, so that the vehicle lighting device of the present disclosure has excellent heat dissipation capability, and no additional heat dissipation device is required. This can effectively reduce the space occupation and the weight of the vehicle lighting device. Based on the above reasons, the vehicle lighting device of the present disclosure is also relatively low in implementation cost.

In preferred technical solutions of the vehicle lighting device of the present disclosure, a technical solution that the light-emitting units 11 are linearly arranged on more than two symmetrical radii from the rotating shaft to the rotation circumference and are located on different rotation radii can effectively improve the light emitting accuracy of the device and can achieve a more delicate irradiation light shape or higher display resolution. The use of the round mounting plate 4 achieves more arrangement manners of the light-emitting units 11 of the light source 1, improves the rotational stability of the light source 1, and can reduce the rotational resistance. The arrangement of the light distribution element 3 at the area in proximity to the plurality of light-emitting units 11 simplifies the structure of the vehicle lighting device of the present disclosure, and thus improves the stability of the structure. In different implementation forms of the reflectors 31 or the condenser 32, different structures are used to achieve convergence of light emitted by the light-emitting units 11 to improve the luminous efficacy and projection distance of the light source 1 and to improve the brightness and clarity of the light shape formed by the vehicle lighting device of the present disclosure.

The vehicle invisible light projection device of the present disclosure uses the invisible light-emitting elements 12 rotating on the rotary actuator 2 to emit invisible light, thus solving the problem that the driver cannot observe illumination dark areas and areas outside the illumination range, and greatly improving the driving safety. In the working process, the invisible light emitting-elements 12 are in a rotating state, and the heat generated by light emission of the invisible light-emitting elements 12 can be better transferred to the air, so that the vehicle invisible light projection device of the present disclosure has excellent heat dissipation capabiliity, and the heat dissipation of the invisible light-emitting elements 12 can be achieved without using an additional heat dissipation device. Therefore, the invisible light projection device of the present disclosure is relatively low in weight and implementation cost.

In a preferred technical solution of the vehicle invisible light projection device of the present disclosure, by using the plurality of invisible light-emitting elements 12 on different rotation radii, each invisible light-emitting element 12 constitutes a different pixel in the rotation plane at each moment, thus improving the range of invisible light projection and the resolution of the invisible light distribution. By using the controller, the rotational speed of the rotary actuator 2 and the light-emitting states of the invisible light-emitting elements 12 can be controlled to create light distribution of invisible light with a certain distribution pattern to achieve invisible light irradiation of some areas, and high-intensity irradiation of some areas may also be achieved under the condition of a certain power of the invisible light-emitting elements 12, to improve the detection accuracy of the target object. By arranging the light-emitting units 11, a light shape of a visible light distribution may be formed while invisible light irradiation areas are formed to achieve visible light illumination of the vehicle. Furthermore, positional settings of the invisible light-emitting elements 12 and the light-emitting units 11 and the control of the controller can achieve cooperation of the invisible light distribution and the visible light distribution meeting design requirements. The use of lens 5 and the light distribution element 3 improves the projection distance and projection accuracy of invisible and visible light.

The target object detection device of the present disclosure can detect target objects within the entire irradiation range of invisible light formed by the invisible light projection device of the present disclosure to sense road conditions within the irradiation range of invisible light, and thus can cooperate with the invisible light projection device of the present disclosure to improve the safe driving performance of the vehicle. Furthermore, the target object detection device has the advantages of the invisible light projection device of the present disclosure.

In the description of this specification, description with reference to terms such as "an embodiment," "some embodiments," or "an implementation" means that specific features described in conjunction with the embodiment or implementation are included in at least one embodiment or implementation of the present disclosure. Illustrative expressions of the above terms are not necessarily directed to the same embodiment or implementation. Moreover, the specific features described may be combined in a suitable manner in any one or more embodiments or implementations. In addition, those skilled in the art may combine and merge different embodiments or implementations in this specification and features in the different embodiments or implementations without mutual conflicts.

Preferred implementations of the present disclosure are described in detail above in conjunction with the accompanying drawings, but the present disclosure is not limited thereto. Within the technical concept of the present disclosure, a variety of simple modifications may be made to the technical solutions of the present disclosure, including combinations of specific technical features in any suitable manner, and to avoid unnecessary repetition, the various possible combinations are not described in the present disclosure. However, these simple modifications and combinations should also be considered as the content disclosed in the present disclosure and are within the protection scope of the present disclosure.

The invention claimed is:

1. A vehicle lighting device, comprising a light source, a rotary actuator, a controller, and a light distribution element, wherein the light source is mounted on a rotating shaft of the rotary actuator, and the controller is adapted to control a light-emitting state of the light source to create different light shapes, and wherein the light distribution element is arranged at an area in proximity to the light source, the light distribution element is able to rotate synchronously with the light source, the light source comprises a plurality of independently controllable light-emitting units, the light distribution element is adapted to converge light emitted by the light-emitting units to avoid mutual influence between light emitted by different light-emitting units, and the controller is adapted to control the light-emitting units to be turned on/off respectively according to a rotational speed of the rotary actuator.

2. The vehicle lighting device according to claim 1, further comprising a mounting plate, the mounting plate being mounted on the rotating shaft of the rotary actuator, and the light source being mounted on the mounting plate.

3. The vehicle lighting device according to claim 1, wherein the light-emitting units are located on different rotation radii of the rotary actuator.

4. The vehicle lighting device according to claim 1, wherein the light-emitting units are divided into at least two groups, and the light-emitting units in each group of light-emitting units are located on different rotation radii of the rotary actuator.

5. The vehicle lighting device according to claim 1, wherein the light-emitting units are divided into at least two groups, and each group of light-emitting units are arranged symmetrically on a rotation circumference of the rotary actuator.

6. The vehicle lighting device according to claim 1, further comprising a lens, light emitted by the light-emitting units being projected by the lens to form a light shape.

7. The vehicle lighting device according to claim 1, wherein the light distribution element is reflectors arranged in areas on two sides of the light-emitting units, reflective surfaces of the reflectors are planar surfaces or curved surfaces; and each reflector is arranged on a side of the plurality of the light emitting units.

8. The vehicle lighting device according to claim 1, wherein the light distribution element is a condenser arranged in a light emergent surface area of the light emitting units, the condenser comprises a light incident surface and a light emergent surface, the light incident surface of the condenser is adapted to introduce light emitted by the light-emitting units, and light converged by the condenser is adapted to be emitted from the light emergent surface of the condenser.

9. The vehicle lighting device according to claim 8, wherein the condenser is arranged in the light emergent surface area of the plurality of light-emitting units.

10. The vehicle lighting device according to claim 9, wherein the condenser is a strip-like transparent device with a cross section in the shape of an isosceles trapezoid, a surface on which an upper base of the isosceles trapezoid is located is the light incident surface of the condenser, and a surface on which a lower base of the isosceles trapezoid is located is the light emergent surface of the condenser.

11. The vehicle lighting device according to claim 9, wherein the condenser is a transparent cuboid device with a cylindrical surface, the cylindrical surface of the transparent device is the light emergent surface of the condenser, and a surface opposite to the cylindrical surface is the light incident surface of the condenser.

12. The vehicle lighting device according to claim 9, wherein the condenser is a plurality of integrally formed plano-convex lenses, planar surfaces of the plurality of plano-convex lenses face a same direction to form the light incident surface of the condenser, and convex surfaces of the plurality of plano-convex lenses form the light emergent surface of the condenser.

13. The vehicle lighting device according to claim 9, wherein the condenser is a plurality of integrally formed light concentrators, light incident surfaces of the plurality of light concentrators are in one-to-one correspondence with the plurality of light-emitting units, and light emergent surfaces of the plurality of light concentrators form a same smooth surface.

14. A vehicle non-visible lighting projection device, comprising the vehicle lighting device of claim 1, wherein a light source comprises non-visible light-emitting elements; and a controller is electrically connected to the non-visible light-emitting elements and a rotary actuator, and the controller is capable of controlling light-emitting states of the non-visible light-emitting elements at different rotation positions to create light distribution of non-visible light.

15. The vehicle non-visible lighting projection device according to claim 14, further comprising a mounting plate, the mounting plate being mounted on a rotating shaft of the rotary actuator, and the light source being mounted on the mounting plate, wherein there are a plurality of non-visible light-emitting elements which are located on different rotation radii of the rotary actuator.

16. The vehicle non-visible lighting projection device according to claim 15, wherein the controller is further electrically connected to the light-emitting units to control light-emitting states of the light-emitting units at different rotation positions to create light distribution of visible light.

17. The vehicle non-visible lighting projection device according to claim 16, further comprising a lens, the lens being capable of projecting non-visible light and visible light emitted by the non-visible light-emitting elements and the light-emitting units.

18. The vehicle non-visible lighting projection device according to claim 16, wherein the non-visible light-emitting elements and/or the light-emitting units are provided with the light distribution element, and the light distribution element is adapted to converge light emitted by the non-visible light-emitting elements and the light-emitting units.

19. A target object detection device, comprising a non-visible light detection device capable of detecting target objects within the irradiation range of non-visible light formed by the non-visible lighting projection device of claim 16.

\* \* \* \* \*

UNITED STATES PATENT AND TRADEMARK OFFICE
CERTIFICATE OF CORRECTION

| | |
|---|---|
| PATENT NO. | : 11,780,362 B2 |
| APPLICATION NO. | : 17/640222 |
| DATED | : October 10, 2023 |
| INVENTOR(S) | : He Zhu et al. |

Page 1 of 1

It is certified that error appears in the above-identified patent and that said Letters Patent is hereby corrected as shown below:

In the Claims

In Claim 16, at Column 24, Line 20, after the word "claim", delete "15" and insert therefor --14--.

In Claim 19, at Column 24, Line 39, after the word "claim", delete "16" and insert therefor --14--.

Signed and Sealed this
Fifth Day of December, 2023

Katherine Kelly Vidal
*Director of the United States Patent and Trademark Office*